United States Patent
Anepu et al.

(10) Patent No.: US 12,439,447 B2
(45) Date of Patent: *Oct. 7, 2025

(54) METHOD AND APPARATUS FOR SUPPORTING WIDEBAND AND MULTIPLE BANDWIDTH TRANSMISSION PROTOCOLS

(71) Applicant: InterDigital Patent Holdings, Inc., Wilmington, DE (US)

(72) Inventors: Bhaskar M. Anepu, Allentown, PA (US); Sudheer A. Grandhi, Pleasanton, CA (US); Xiaofei Wang, North Caldwell, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/179,547

(22) Filed: Apr. 15, 2025

(65) Prior Publication Data
US 2025/0247881 A1    Jul. 31, 2025

Related U.S. Application Data

(63) Continuation of application No. 18/479,602, filed on Oct. 2, 2023, now Pat. No. 12,302,382, which is a
(Continued)

(51) Int. Cl.
*H04W 74/04* (2009.01)
*H04W 28/06* (2009.01)
(Continued)

(52) U.S. Cl.
CPC .......... *H04W 74/04* (2013.01); *H04W 28/06* (2013.01); *H04W 28/26* (2013.01); *H04W 74/06* (2013.01);
(Continued)

(58) Field of Classification Search
CPC ..... H04W 74/04; H04W 28/06; H04W 28/26; H04W 74/06; H04W 74/0808;
(Continued)

(56) References Cited

U.S. PATENT DOCUMENTS

| | | |
|---|---|---|
| 7,161,951 B1 | 1/2007 | Sherman |
| 7,885,287 B2 | 2/2011 | Bachrach et al. |

(Continued)

FOREIGN PATENT DOCUMENTS

| | | |
|---|---|---|
| WO | 07/078073 | 7/2007 |
| WO | 10/064766 | 6/2010 |

OTHER PUBLICATIONS

Cariou et al., "Multi-channel Transmissions," IEEE 802.11-09/1022r0 (Sep. 2009).
(Continued)

*Primary Examiner* — Ivan O Latorre
(74) *Attorney, Agent, or Firm* — VOLPE KOENIG

(57) ABSTRACT

Enhanced protocols and devices may be used to alleviate loss of spectrum efficiency in wideband transmission. The protocols may implement a wideband transmission opportunity (TXOP) truncation where one or more of the channels involved in communication over the wideband are released. In one scenario, an access point (AP) may receive, from a wireless transmit receive unit (WTRU), a first CF-End frame that includes a duration field and a basic service set identifier (BSSID) field that includes an individual/group bit. On a condition that the individual/group bit of the BSSID field has a value of one (1), the AP may determine that a scrambling sequence of the first CF-End frame indicates a bandwidth associated with a transmit opportunity (TXOP) being truncated by the WTRU. The AP may then transmit a second CF-End frame at the bandwidth indicated by the scrambling sequence of the first CF-End frame.

24 Claims, 14 Drawing Sheets

Related U.S. Application Data continuation of application No. 17/176,737, filed on Feb. 16, 2021, now Pat. No. 11,778,660, which is a continuation of application No. 16/449,898, filed on Jun. 24, 2019, now Pat. No. 10,925,088, which is a continuation of application No. 15/827,957, filed on Nov. 30, 2017, now Pat. No. 10,334,626, which is a continuation of application No. 15/180,231, filed on Jun. 13, 2016, now Pat. No. 9,844,075, which is a continuation of application No. 13/529,651, filed on Jun. 21, 2012, now Pat. No. 9,369,918.

(60) Provisional application No. 61/642,048, filed on May 3, 2012, provisional application No. 61/607,352, filed on Mar. 6, 2012, provisional application No. 61/508,524, filed on Jul. 15, 2011, provisional application No. 61/500,788, filed on Jun. 24, 2011.

(51) Int. Cl.

| | |
|---|---|
| *H04W 28/26* | (2009.01) |
| *H04W 74/00* | (2009.01) |
| *H04W 74/06* | (2009.01) |
| *H04W 74/0808* | (2024.01) |
| *H04W 74/0816* | (2024.01) |
| *H04W 76/11* | (2018.01) |
| *H04W 88/08* | (2009.01) |

(52) U.S. Cl.
CPC ... *H04W 74/0808* (2013.01); *H04W 74/0816* (2013.01); *H04W 76/11* (2018.02); *H04W 74/004* (2013.01); *H04W 74/006* (2013.01); *H04W 88/08* (2013.01)

(58) Field of Classification Search
CPC ............. H04W 74/0816; H04W 76/11; H04W 74/004; H04W 74/006; H04W 88/08
See application file for complete search history.

(56) References Cited

U.S. PATENT DOCUMENTS

| | | | |
|---|---|---|---|
| 2002/0071448 | A1 | 6/2002 | Cervello et al. |
| 2002/0181425 | A1 | 12/2002 | Sherman |
| 2003/0123405 | A1 | 7/2003 | Del Prado et al. |
| 2005/0135284 | A1 | 6/2005 | Nanda et al. |
| 2007/0115853 | A1 | 5/2007 | Wentink |
| 2007/0115882 | A1 | 5/2007 | Wentink et al. |
| 2007/0171858 | A1 | 7/2007 | Grandhi et al. |
| 2007/0217352 | A1 | 9/2007 | Kwon |
| 2007/0248117 | A1 | 10/2007 | Zuniga et al. |
| 2008/0013496 | A1 | 1/2008 | Dalmases et al. |
| 2008/0112351 | A1 | 5/2008 | Surineni et al. |
| 2010/0135268 | A1 | 6/2010 | Seok |
| 2011/0305288 | A1* | 12/2011 | Liu ................... H04L 25/0204 375/295 |
| 2012/0063433 | A1 | 3/2012 | Wentink |
| 2012/0087355 | A1 | 4/2012 | Wentink |
| 2012/0106426 | A1 | 5/2012 | Hart et al. |
| 2012/0134324 | A1 | 5/2012 | Chu et al. |
| 2012/0177017 | A1 | 7/2012 | Gong et al. |
| 2012/0207036 | A1 | 8/2012 | Ong et al. |
| 2012/0250617 | A1* | 10/2012 | Wentink ................ H04W 80/02 370/328 |
| 2022/0353123 | A1* | 11/2022 | Kim .................... H04L 27/2603 |

OTHER PUBLICATIONS

Chen et al., "Proposed TGac Draft Amendment," IEEE 802.11-10/1361r3 (Jan. 2011).

Cheong, "TGah Functional Requirements and Evaluation Methodology Rev. 5," IEEE 802.11-11/0905r5, Jan. 19, 2012.

Chu et al., "80 MHz/160MHz Protection," IEEE 802.11-10/1096r4 (Sep. 2010).

De Vegt, "Channelization and Bandwidth Modes for 802.11ah," IEEE 802.11-11/1238r0 (Sep. 2011).

Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: TV White Spaces Operation, IEEE P802.11af/D1.06 (Mar. 2012).

Draft Standard for Information Technology—Telecommunications and information exchange between systems—Local and metropolitan area networks—Specific requirements Part 11: Wireless LAN Medium Access Control (MAC) and Physical Layer (PHY) specifications, Amendment 4: Enhancements for Very High Throughput for Operation in Bands below 6 GHz, IEEE P802.11ac/D2.0 (Jan. 2012).

Gast, "802.11 Wireless Networks: The Definitive Guide, $2^{nd}$ Edition," O'Reilly Media Inc., pp. 218-223 (Apr. 25, 2005).

Grandhi, "LB187 Proposed Resolution to CID 5274," IEEE 802.11-12/0671r2 (May 2012).

IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 11, 2005).

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, Amendment 7: Extensions to Direct-Link Setup (DLS), IEEE 802.11z-2010 (Oct. 14, 2010).

IEEE Standards Association, "Use of the IEEE assigned Organizationally Unique Identifier with ANSI/IEEE Std 802-2001 Local and Metropolitan Area Networks," ANSI/IEEE Std 802-2001 Local and Metropolitan Area Networks Tutorial Rev., pp. 1-3 (Nov. 2001).

Institute of Electrical and Electronics Engineers, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput for Operation in Bands Below 6 GHz," IEEE P802.11ac/D1.0, (May 2011).

Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications," IEEE Std 802.11n-2009, (Jun. 2007).

Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications," IEEE Std 802.11-2012, (Mar. 2012).

Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Higher Throughput," IEEE Std 802.11n-2009, (Sep. 2009).

Noh et al., "Channel Selection and Management for 11ac," IEEE 802.11-10/0593r1 (May 2010).

Park, "Proposed Specification Framework for TGah", IEEE 802.11-11/1137r5, 12 pgs., (Jan. 19, 2012).

* cited by examiner

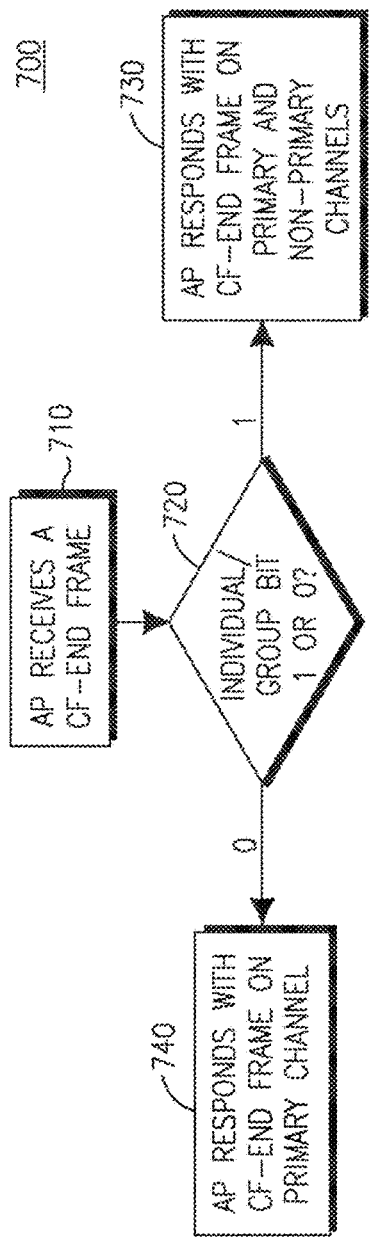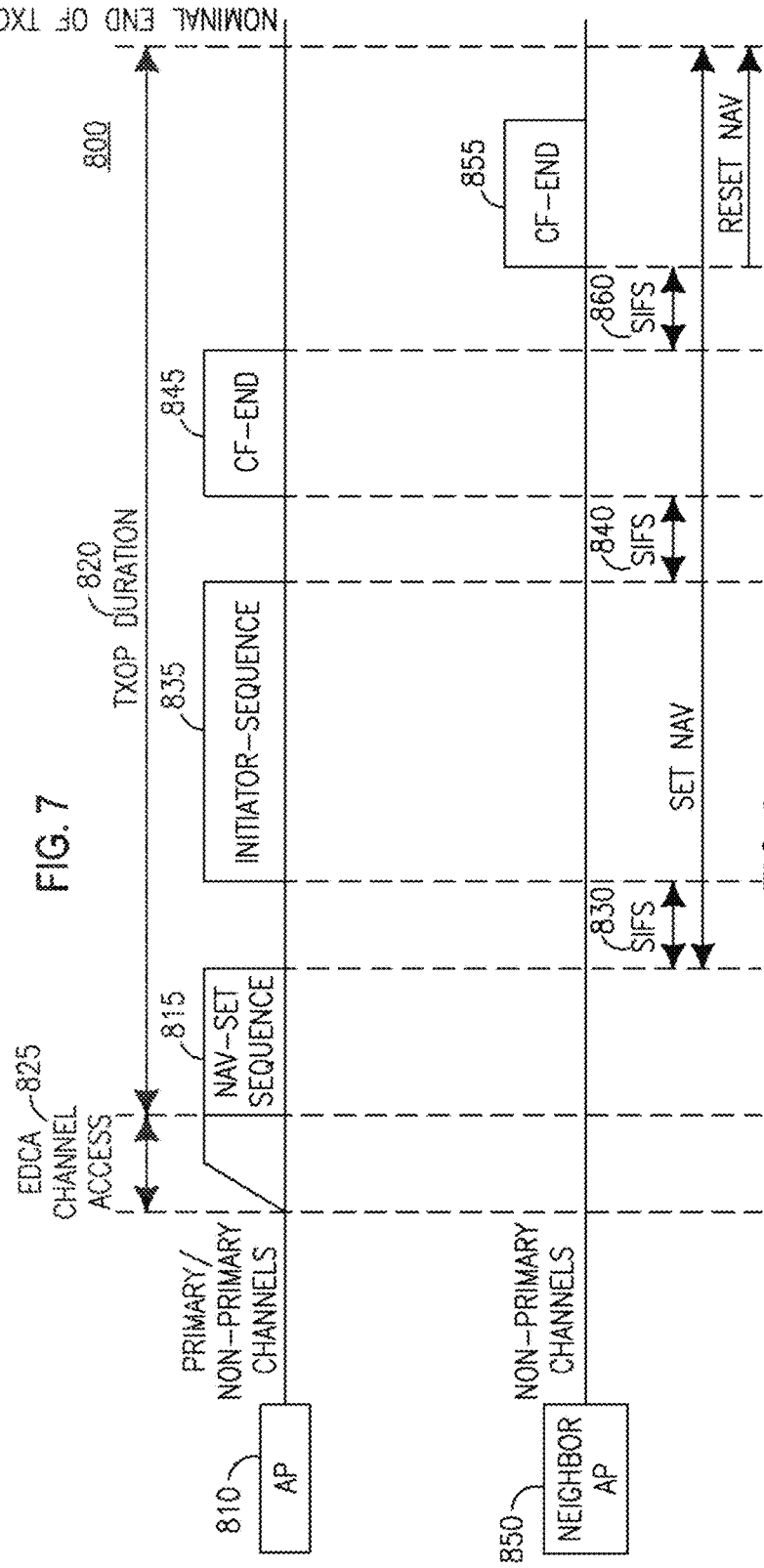
FIG. 7
FIG. 8

METHOD AND APPARATUS FOR SUPPORTING WIDEBAND AND MULTIPLE BANDWIDTH TRANSMISSION PROTOCOLS

CROSS REFERENCE TO RELATED APPLICATIONS

This application is a continuation of U.S. patent application Ser. No. 18/479,602 filed on Oct. 2, 2023 which is a continuation of U.S. patent application Ser. No. 17/176,737 filed Feb. 16, 2021 now issued on Oct. 3, 2023 as U.S. Pat. No. 11,778,660 which is a continuation of U.S. patent application Ser. No. 16/449,898 filed on Jun. 24, 2019, which issued on Feb. 16, 2021 as U.S. Pat. No. 10,925,088, which is a continuation of U.S. patent application Ser. No. 15/827,957 filed on Nov. 30, 2017, which issued on Jun. 25, 2019 as U.S. Pat. No. 10,334,626, which is a continuation of U.S. patent application Ser. No. 15/180,231 filed on Jun. 13, 2016, which issued on Dec. 12, 2017 as U.S. Pat. No. 9,844,075, which claims the benefit of U.S. patent application Ser. No. 13/529,651 filed on Jun. 21, 2012, which issued on Jun. 14, 2016 as U.S. Pat. No. 9,369,918, which claims the benefit of U.S. Provisional Application No. 61/500,788 filed on Jun. 24, 2011, U.S. Provisional Application No. 61/508,524 filed on Jul. 15, 2011, U.S. Provisional Application No. 61/607,352 filed on Mar. 6, 2012, and U.S. Provisional Application No. 61/642,048 filed on May 3, 2012, the contents of which are hereby incorporated by reference herein.

BACKGROUND

A wireless local area network (WLAN) in an infrastructure basic service set (BSS) mode may include an access point (AP) for the BSS and one or more wireless transmit/receive units (WTRUs) associated with the AP. The AP may access or interface with a distribution system (DS) or another type of wired or wireless network that carries traffic in and out of the BSS. Traffic to WTRUs that originates from outside the BSS may arrive through the AP and may be delivered to the WTRUs. Traffic originating from WTRUs to destinations outside the BSS may be transmitted to the AP to be delivered to the respective destinations.

Traffic between WTRUs within the BSS may also be transmitted through the AP where the source WTRU transmits traffic to the AP, and the AP delivers the traffic to the destination WTRU. Such traffic between WTRUs within a BSS may be peer-to-peer traffic. Such peer-to-peer traffic may also be transmitted directly between the source and destination WTRUs with a direct link setup (DLS) using an IEEE 802.11e DLS or an IEEE 802.11z tunneled DLS (TDLS). A WLAN in an independent BSS mode may not have APs and WTRUs that communicate directly with each other.

New spectrum is being allocated in various countries around the world for wireless communication systems such as WLANs. Such spectrum may be limited in the size and also in the bandwidth of the channels it comprises. Given the limitations of such spectrum, WLANs may only be able to support smaller bandwidths and lower data rates, as compared to high throughput (HT) and very high throughput (VHT) WLANs, such as IEEE 802.11n and current draft IEEE 802.11ac based WLANs, respectively. For example, such is the case in spectrum allocated below 1 GHz in various countries with bandwidths of 1, 2, 4, 8 and 16 MHZ. Another example is the television white space (TVWS) spectrum. In addition, more than one primary bandwidth mode may be supported because sometimes only some bandwidth modes are reliable or feasible for communication because of poor wireless link conditions and also because only some bandwidth modes allow a longer range in communication. Higher bandwidth transmissions may be supported as an aggregation of multiple primary bandwidth mode channels. One such example is in the sub 1 GHz spectrum where there may be BSSs supporting and allowing operation of 2 MHz and 1 MHz bandwidth modes as the primary bandwidth modes. Higher bandwidth transmissions, (e.g., 4 MHZ, 8 MHZ, 16 MHZ), may be supported over multiples of 2 MHz/1 MHz bandwidths.

The WTRUs may support an increased communication range with a robust low rate modulation and coding set with repetition in a 1 MHz mode. Also, the WTRUs may be capable of receiving in 2 MHz and 1 MHz modes.

SUMMARY

Enhanced protocols may be used to alleviate loss of spectrum efficiency in wideband transmission. The protocols may implement wideband transmission opportunity (TXOP) truncation where all of the channels involved in communication over the wideband may be released. In one scenario, a wireless transmit/receive unit (WTRU) may obtain a TXOP, (i.e., reserve a medium), for a 2 MHz bandwidth mode frame transmission with another device, (e.g., another WTRU or an access point (AP)), capable of the 2 MHz bandwidth mode and a 1 MHz bandwidth mode. The WTRU may conduct a request-to-send (RTS)/clear-to-send (CTS) frame exchange in the second bandwidth mode, and truncate the TXOP with a contention free (CF)-End frame in the first and second bandwidth modes. In another scenario, an AP may obtain a TXOP for a 2 MHz bandwidth mode frame transmission with a WTRU capable of both 2 MHz and 1 MHz bandwidth modes.

An AP may receive, from a WTRU, a first CF-End frame and transmit a second CF-End frame in response to the first CF-End frame. The first CF-End frame may include a duration field and a basic service set identifier (BSSID) field that includes an individual/group bit indicating whether a bandwidth value is set. The second CF-End frame may be transmitted on a primary channel and/or on one or more non-primary channels based on whether the bandwidth value is set. The individual/group bit may indicate that a scrambling sequence is included in the first CF-End frame, and may indicate that the scrambling sequence includes bandwidth information. If the individual/group bit of the BSSID field has a value of one (1), the AP may determine that the scrambling sequence of the first CF-End frame indicates a bandwidth associated with a TXOP being truncated by the WTRU. The AP may then transmit the second CF-End frame at the bandwidth indicated by the scrambling sequence of the first CF-End frame.

A WTRU may maintain a first and second network allocation vector (NAV) counter and receive a CF-End frame from another WTRU. The CF-End frame may indicate a truncation of a TXOP of the other WTRU. The WTRU may update the first and second NAV counters based on the received CF-End frame. Based on the updated first and second NAV counters, the WTRU may determine whether to attempt to access the medium.

A WTRU may maintain a TXOP holder MAC address and receive a CF-End frame from another WTRU. The CF-End frame may indicate a truncation of a TXOP of the other WTRU. The WTRU may reset the NAV counter of the WTRU based on a BSSID field in the received CF-End frame.

BRIEF DESCRIPTION OF THE DRAWINGS

A more detailed understanding may be had from the following description, given by way of example in conjunction with the accompanying drawings wherein:

FIG. 7 is a diagram of an example method for transmitting a CF-End frame with a parameter set to truncate a transmit opportunity (TXOP);

FIG. 8 is a diagram of an example wideband TXOP protocol;

DETAILED DESCRIPTION

Figure 1A:
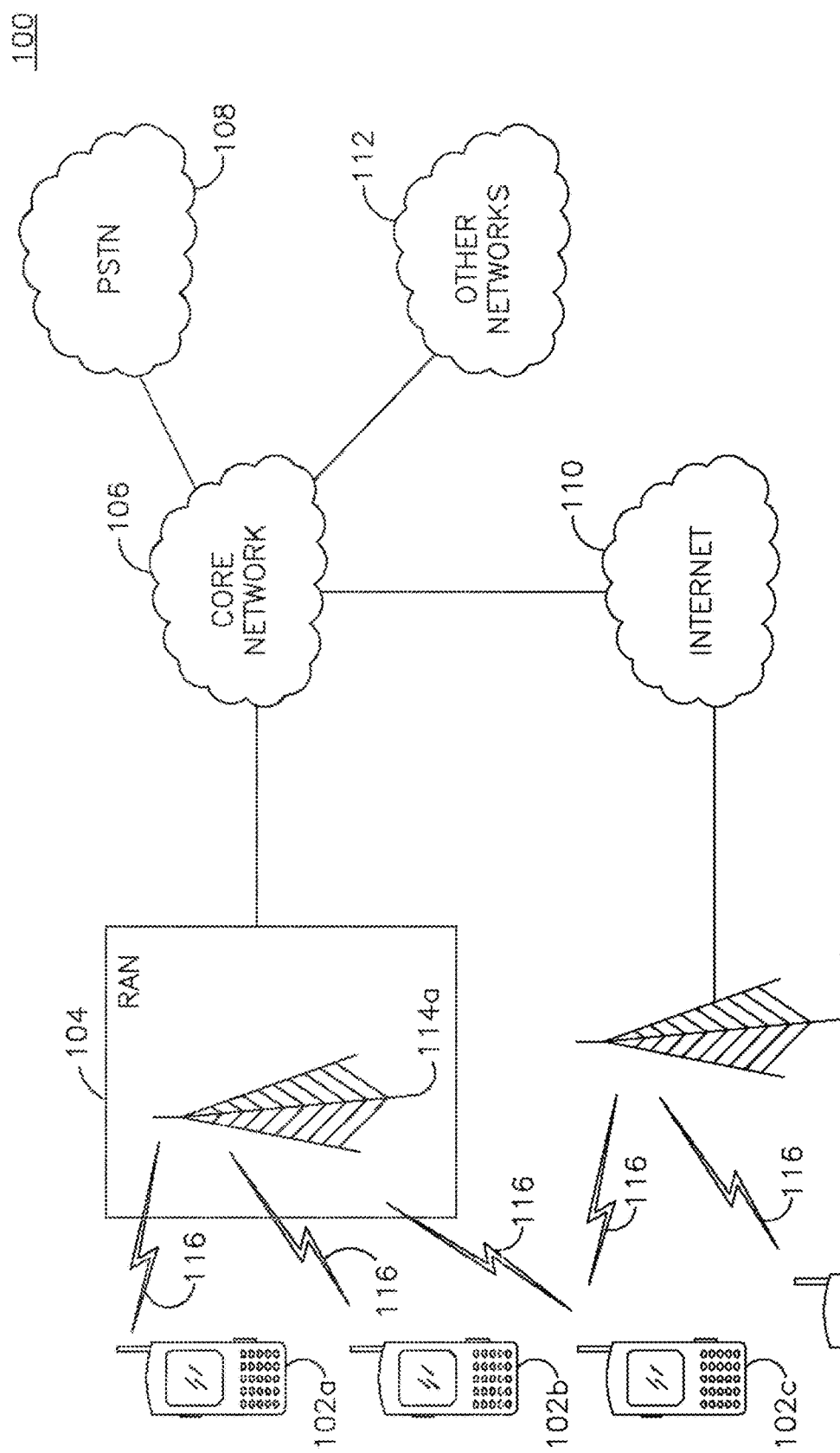
FIG. 1A is a diagram of an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
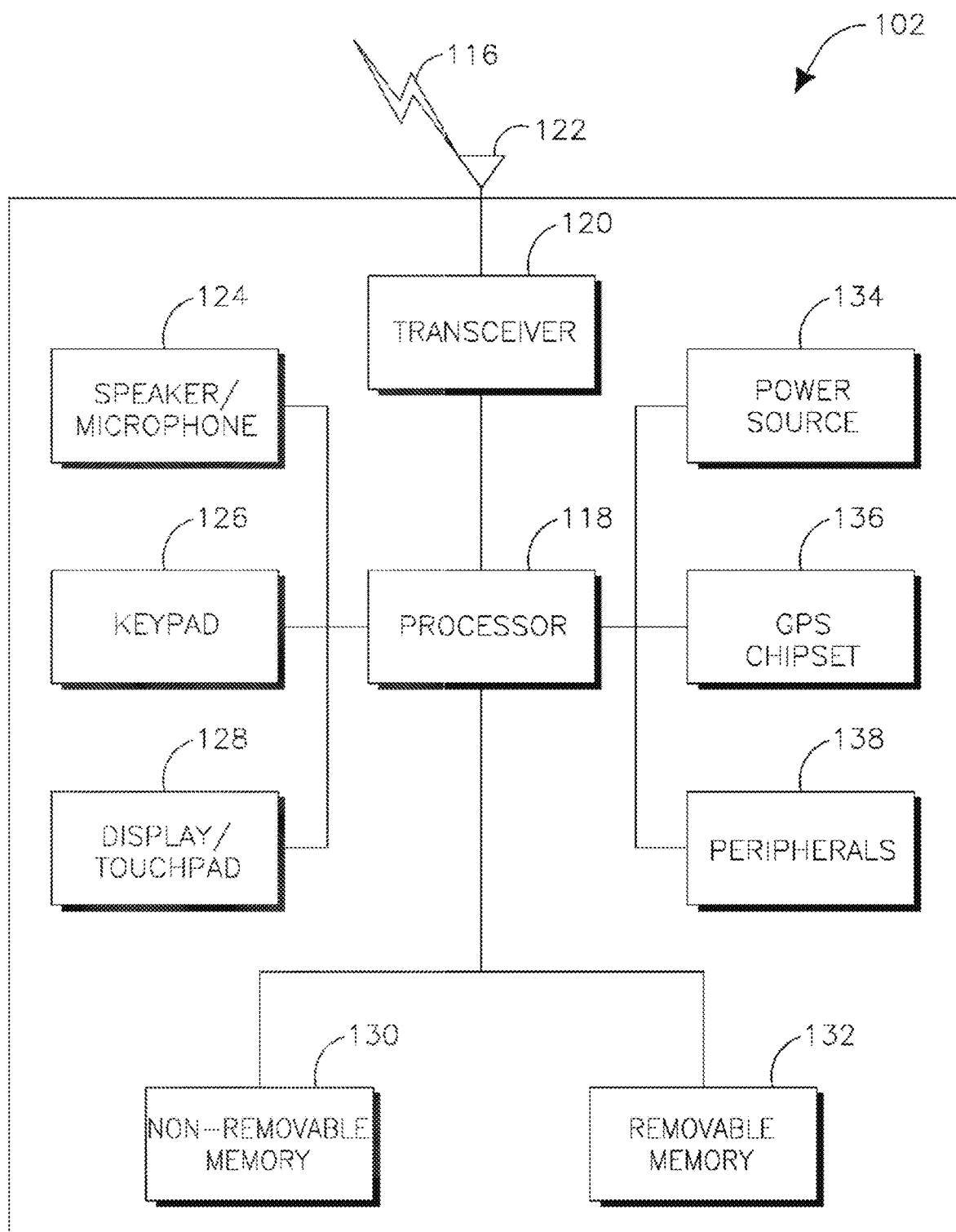
FIG. 1B is a diagram of an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
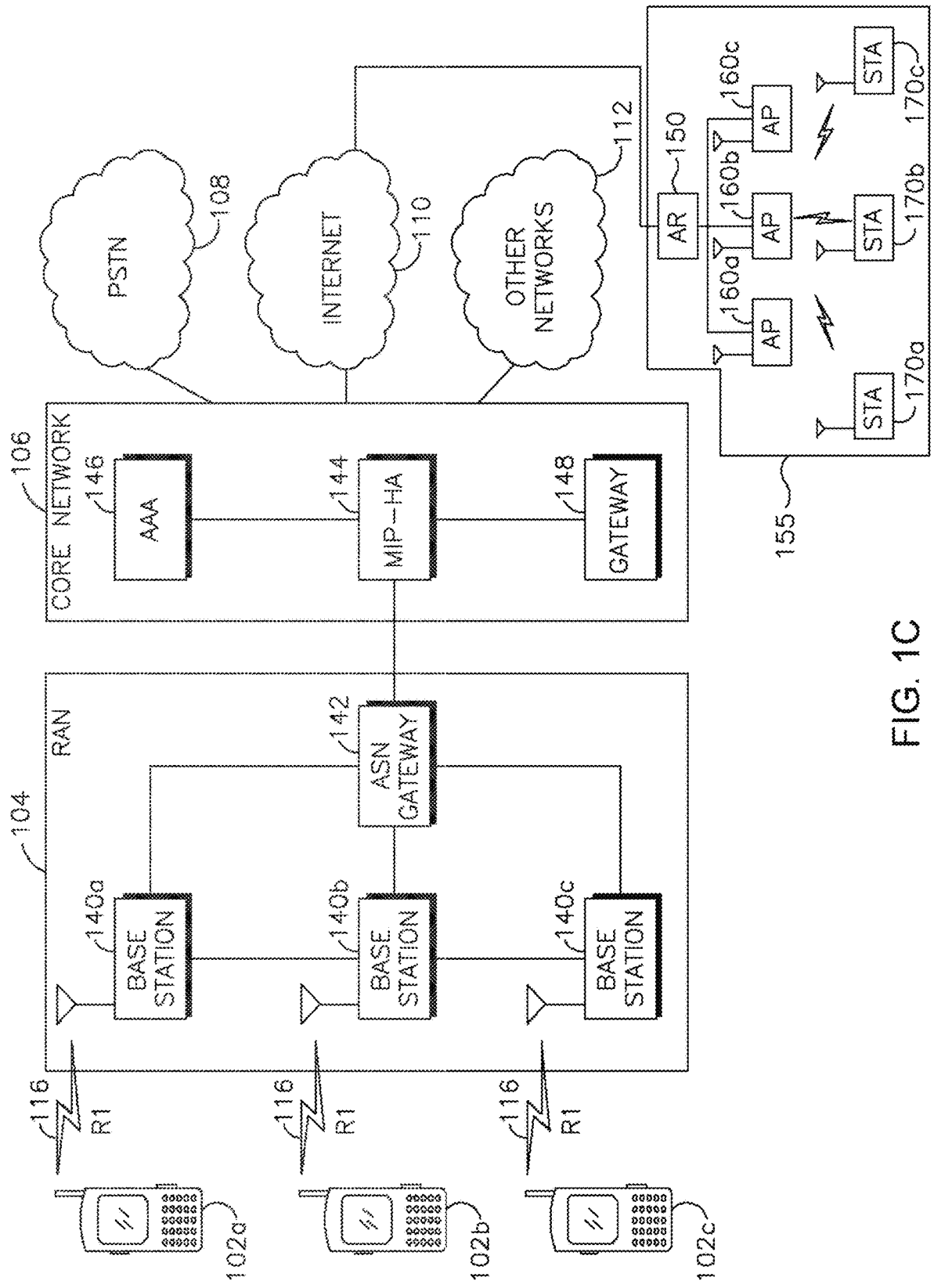
FIG. 1C is a diagram of an example radio access network and an example core network that may be used within the communications system shown in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Herein, the terminology "WTRU" may include but is not limited to a station (STA), a user equipment (UE), a mobile station, a fixed or mobile subscriber unit, a pager, a cellular telephone, a personal digital assistant (PDA), a computer, a mobile internet device (MID) or any other type of user device capable of operating in a wireless environment.

When referred to herein, the terminology "AP" may include but is not limited to a base station, a Node-B, a site controller, or any other type of interfacing device capable of operating in a wireless environment.

A network allocation vector (NAV) protection mechanism may be used at the medium access control (MAC) layer to protect packet transmissions on the wireless medium. For the embodiments described herein, the terms device, node, or device/node may refer to, for example, a WTRU, an AP, or any other node. A NAV may be an indicator maintained by each device/node, of a time period when transmission on the wireless medium may not be initiated by the device/node. Each frame may contain a duration field that is set to a time period as defined by the MAC layer protocol. The duration field may be set to a time period corresponding to the transmission of any subsequent frames along with inter-frame spacing as required by the frame exchange sequences defined in the MAC layer protocol. A device that receives a valid frame not addressed to it, may update its NAV using the information in the duration field of the received frame if the update results in a new NAV value that may be greater than the current NAV value.

In a BSS, packet collisions may occur because of a hidden node. To mitigate the hidden node problem, a request-to-send (RTS) and a clear-to-send (CTS) frame exchange may be used to set the NAV appropriately in the neighborhoods of the devices engaged in a frame exchange. To obtain a transmit opportunity (TXOP) and reserve the medium, a device may transmit an RTS frame addressed to a recipient device as the first frame of a frame exchange sequence. The recipient device may respond with a CTS frame addressed to the device that transmitted the RTS frame. In this way the NAV may be set for other WTRUs in the neighborhoods of the devices to support the frame exchange sequence. The duration fields in the RTS and CTS frames may be set to protect the desired frame exchange sequence.

Alternatively, a CTS-to-self frame may be transmitted before a transmission requiring protection. A device may first transmit a CTS frame addressed to itself and with a duration value that protects the subsequent transmissions. This alternative may involve less overhead than other protection mechanisms.

WLANs with very high throughput (VHT) of greater than 100 Mbps on top of the MAC layer, for example in accordance with current draft IEEE 802.11ac, may be used to enhance system performance and achieve high data rates. VHT WLANs may include features such as wideband transmissions by aggregating channels. For example, for IEEE 802.11, a channel may be 20 MHz wide. In another example, four (4) 20 MHz channels may be aggregated for an 80 MHz wideband transmission.

A BSS may operate with a 20 MHz channel as a primary channel on which the devices of the BSS may camp or be associated with. In order for a device to perform a wideband transmission, it may aggregate one or more non-primary 20 MHz channels with the primary 20 MHz channel to create a desired bandwidth to support the wideband transmission. Any channel that is not a primary channel may be referred to as a secondary channel or a non-primary channel. In addition, the device may set the NAV of other devices on the non-primary channels of the aggregated channel for the wideband transmission. To set the NAV of the devices on the non-primary channels, the initiating device of the wideband transmission may conduct an RTS-CTS frame exchange on the non-primary channels with the receiving/responding device of the wideband transmission. The receiving/responding device may respond to the RTS frame from the initiating device on the one or more non-primary channels with a CTS frame if it determines that the non-primary channel is clear/idle/not-busy. For example, the receiving/responding device may respond with a CTS frame when there is no potentially interfering signal, energy, or transmission.

If the receiving/responding device on the one or more non-primary channels responds with a CTS frame, then the initiating device may assume that the non-primary channels are available for use and may aggregate the channels into the bandwidth for wideband transmission. If the receiving/responding device does not respond with a CTS frame on the one or more non-primary channels, or there is a failure in the reception of the CTS frame, the initiating device may assume that the one or more non-primary channels is not available for use and may not aggregate the channels into the bandwidth for wideband transmission. However, the RTS frame transmitted by the initiating device may set the NAV so that the devices in its neighborhood may not reset the NAV until a CTS timeout interval. The CTS timeout interval may include the duration from the reception of RTS from the initiating device to the start of the reception of a packet following the RTS from the initiating device. The NAV in the neighboring devices may be set as:

$$(2\times\text{SIFS})+(CTS\text{ Time})+\text{Receiver Start Delay}+(2\times\text{Slot Time}), \quad \text{Equation(1)}$$

where the short inter-frame spacing (SIFS) and Slot Time may be system parameters.

Two cases may be considered with respect to the deployment of overlapping BSS (OBSS) in the neighborhood: an OBSS case and a non-OBSS case. The OBSS case may include a scenario where the communication between the transmitting and receiving devices may interfere with a neighboring BSS, and may impact performance.

In a non-OBSS case, if the neighbor devices that have their NAV set by the RTS frame are in the same BSS as the initiating device that transmitted the RTS, the neighbor devices may not be able to use those channels for an off-channel DLS/TDLS operation until a CTS timeout interval. This may lead to an inefficient usage of the spectrum. In an OBSS case, if the neighbor devices that have their NAV set by the RTS frame are in an OBSS, the neighbor devices may not be able to use those channels for the duration of a CTS timeout interval, which may lead to an inefficient usage of the spectrum.

The inefficiency in usage of spectrum for the OBSS devices may affect basic BSS operation, for example, communication between an AP and one or more WTRUs, and their respective DLS/TDLS operation. OBSS interference may occur in dense urban deployments with the proliferation of wireless devices. This problem may be aggravated if the non-primary channel for the BSS in question is a primary channel for the OBSS. An enhanced protocol may be designed to alleviate this loss of spectrum efficiency for the devices in the OBSS.

In both example cases above, any WTRU that sets its NAV based on the duration field of the RTS frame may consider the medium to be busy for a CTS timeout interval, regardless of whether the medium was actually reserved with an acknowledging CTS frame.

In another example, a WTRU may successfully reserve the medium on a primary channel and one or more non-primary channels for a pre-determined duration of time, which may be referred to as a wideband TXOP duration. The wideband TXOP may be a TXOP for the initiating WTRU over a wideband that includes a primary channel and one or more non-primary channels. One way of reserving the medium may be performing a successful RTS-CTS frame exchange on the requested channels. The WTRUs that receive either the RTS frame, the CTS frame, or both, may set their NAVs based on a duration field contained in these frames. The medium may be reserved and the NAV may be set by any other allowed MAC protocol. The allowed MAC protocol may not include RTS-CTS. Though the medium may have been successfully reserved by the initiating WTRU for a pre-determined duration, for example, for a wideband TXOP duration, the data transmission may not last for the total wideband TXOP duration for which the medium has been reserved. In this situation, the device that may hold the TXOP, or may have reserved the medium for the wideband TXOP duration, may initiate a procedure to truncate the wideband TXOP so that the medium may be released to other devices, including those in an OBSS, on channels aggregated in the wideband transmission.

Figure 2:
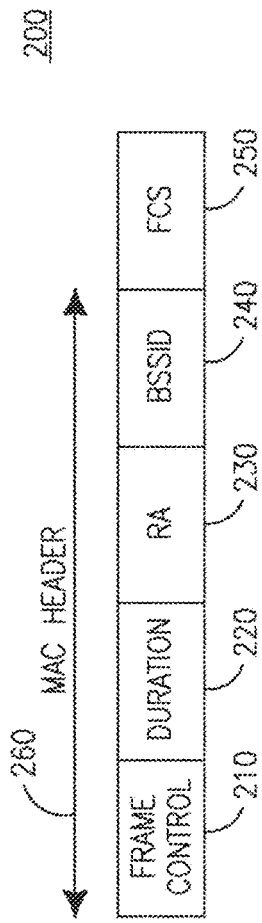
FIG. 2 is a diagram of an example format of an IEEE 802.11 contention free (CF)-End frame.

FIG. 2 is a diagram of an example format of an IEEE 802.11 CF-End frame 200. The CF-End frame may include a frame control field 210, a duration field 220, an RA field 230, a basic service set identifier (BSSID) field 240, and an FCS field 250. The frame control field 210, the duration field 220, the RA field 230, and the BSSID field 240 may be included in a MAC header 260. The BSSID may be included a timing advance (TA) field. In the CF-End frame 200, the duration field 220 may be set to 0 and the RA field 230 may include the broadcast group address.

Each BSS may be uniquely identified by a BSSID. The CF-End frame may have a BSSID field 240, and it may be, for example, a TA field that contains the BSSID of the WTRU transmitting it. Any WTRU that receives a CF-End frame may reset its NAV. This procedure for truncation of TXOP may be inadequate for truncation of wideband TXOP in VHT WLANs, since the medium may be released to all WTRUs, including those in an OBSS, on all channels in the wideband spectrum. A wideband TXOP truncation procedure to solve this problem is described herein. TXOP reservation and truncation mechanisms are described herein for multiple primary bandwidth modes as well.

Mechanisms for bandwidth and static/dynamic indications in the spectrum where legacy devices operate, for example, as in IEEE 802.11ac, may have to adopt signaling and protocol methods that may be constrained to support legacy compatibility. Such indications may be used in control frames, for example, in an RTS/CTS exchange for wideband TXOP reservation. In certain spectrums allocated for WLAN, for example, below 1 GHZ, there may be no requirement of compatibility with legacy devices. This lack of compatibility may be exploited in designing new methods in signaling and protocol for bandwidth and static/dynamic indications.

The basic IEEE 802.11 CF-End mechanisms that truncate TXOP reservation may have some deficiencies. A WTRU may interpret the reception of a CF-End frame as a NAV reset, and it may reset its NAV timer to 0 at the end of the PPDU containing this frame, irrespective of whether the NAV has been set in the WTRU that transmitted the CF-End frame. This may lead to a premature cancellation of the NAV, and decreased performance due to a packet collision that may be caused by such premature NAV cancellations.

Figure 3:
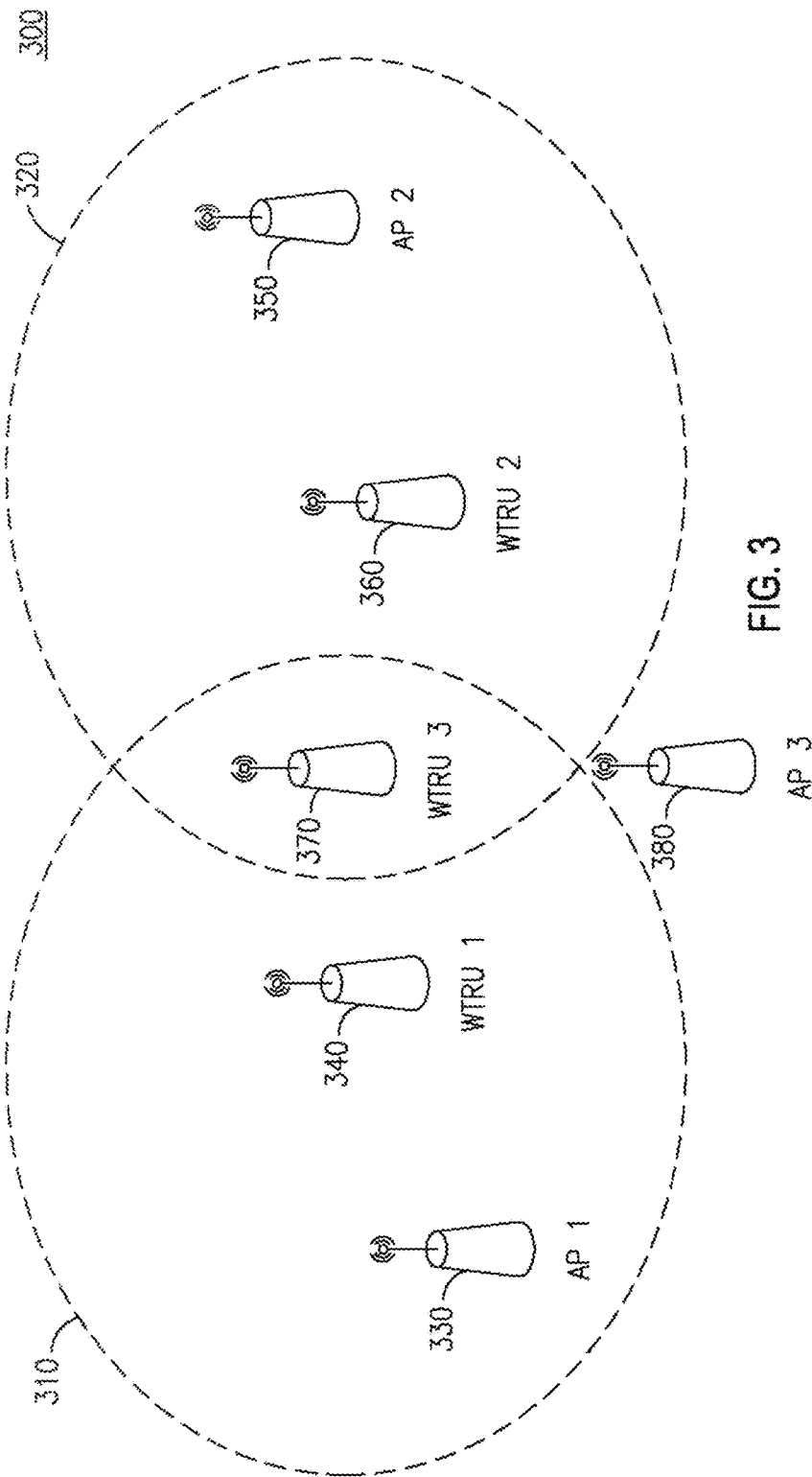
FIG. 3 is a diagram of an example network in which a CF-End frame may lead to premature cancellation of a network allocation vector (NAV)

FIG. 3 is a diagram of an example network 300 in which the design of a CF-End frame may lead to premature cancellation of a NAV. FIG. 3 shows a first BSS (BSS1) 310 and a second BSS (BSS2) 320. As shown in FIG. 3, AP1 330 and WTRU1 340 belong to BSS1 310; AP2 350 and WTRU2 360 belong to BSS2 320; and WTRU3 370 may belong to BSS1 310 or it may belong to another overlapping BSS (OBSS) BSS3 (not shown) started by AP3 380. WTRU3 370 may be within radio range of WTRU1 340, WTRU2 360 and AP3 380; AP1 330, AP2 350 and AP3 380 may not be able to hear each other; WTRU1 340 may be within range of AP1 330 and WTRU3 370, while WTRU2 360 may be within range of AP2 350 and WTRU3 370.

Figure 4:
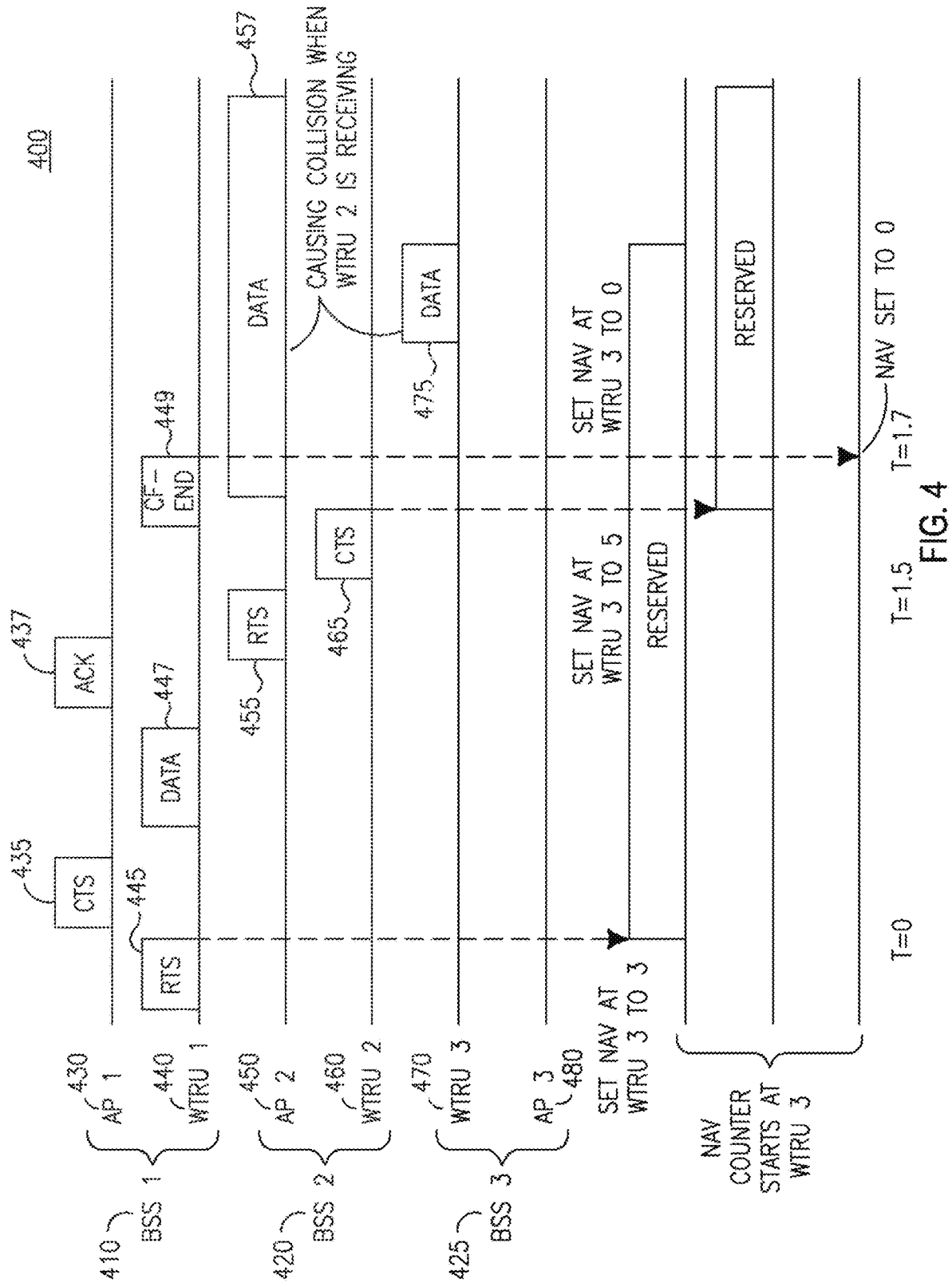
FIG. 4 is a diagram of example of packet exchanges of the network of FIG. 3.

FIG. 4 is a diagram of example of packet exchanges 400 of the network of FIG. 3, which may lead to premature cancellation of NAV at WTRU3 due to the current design of truncation of TXOP by using CF-End frames. FIG. 4 shows a first BSS (BSS1) 410 and a second BSS (BSS2) 420. As shown in FIG. 4, AP1 430 and WTRU1 440 belong to BSS1 410; AP2 450 and WTRU2 460 belong to BSS2 420; and WTRU3 470 may belong to BSS1 410 or it may belong to another overlapping BSS (OBSS) BSS3 425 started by AP3 480.

As shown in FIG. 4, at T=0 ms, WTRU1 440 may transmit an RTS frame 445 to reserve the medium for 3 ms, and set the NAV counter at WTRU3 480 to be 3 ms. AP1 430 may respond with a CTS frame 435, after which the WTRU1 440 may start to transmit its data frame 447 to AP1 430. AP1 430 may subsequently transmit an acknowledgement (ACK) 437 of the reception of the data packet. At time T=1.5 ms, AP2 450, without being able to hear the ACK 437 transmitted by AP1 430, may transmit an RTS frame 455 to WTRU2 460. When WTRU2 460 receives the RTS frame 455 from AP2 450, it may respond with a CTS frame 465 to reserve the medium for 5 ms, and may update the NAV counter at WTRU3 470 to be 5 ms. AP2 450, after receiving the CTS frame 465 from WTRU2 460, may start transmitting its data packet 457 for WTRU2 460. At T=1.7 ms, WTRU1 440, which may have finished all of its transmissions, may transmit a CF-End frame 449 to indicate truncation of its TXOP. WTRU3 470 may set its NAV=0 after receiving the CF-End frame 449 from WTRU1 440 though the current NAV at WTRU3 470 is set by WTRU2 460, which may currently be receiving a data packet 475 after a correct medium reservation. WTRU3 470 may decide to compete for medium access, since its NAV=0 and WTRU3 470 may not sense any activity using clear channel assessment (CCA). This may lead to a collision at WTRU2 460. WTRU2 460 may fail to receive its packets from AP2 450, and may lead to a breakdown of the medium reservation mechanism and decreased system performance.

The problem of premature cancellation of NAV is expected to be more prevalent in the current and future generations of WLAN systems due to increased WLAN coverage ranges. In IEEE 802.11ah systems, for example, a WTRU may be required to have a coverage range of up to 1 km. This may lead to a much greater number of overlapping BSSs in the same area. The chance of hearing a CF-End frame that erroneously cancels NAV counters may increase with the number of OBSSs.

The problem of premature cancellation of a NAV may also be more prevalent in the current and future generations of WLAN systems due to lower data rates. In IEEE 802.11ah systems, for example, a WTRU may have a data rate as low as 100 kbps. Transmissions using a low data rate may lead to a longer transmission time, which may require more frequent application of a medium reservation mechanism, which in turn may lead to more frequent truncation of TXOPs and more frequent premature cancellations of NAVs at WTRUs.

The problem of premature cancellation of a NAV may also be more prevalent in the current and future generations of WLAN systems due to multiple operating bandwidths in OBSS. For example, in IEEE 802.11ac, 802.11af and 802.11ah systems, there may be multiple operating modes with variable, and sometimes dynamic, operating bandwidths. More frequent application of medium reservation mechanisms may provide protection of different and/or dynamic operating modes with variable bandwidths in OBSSs, which in turn may lead to more frequent truncation of TXOPs and more frequent premature cancellations of NAVs at WTRUs.

A method and apparatus may be used to alleviate the loss of spectrum efficiency in wideband transmission. For example, when a medium reservation is conducted by a device in a BSS over a wideband that it may not be able to use in its entirety, the method and apparatus may release unusable bandwidth. The released bandwidth may be used by devices in the same BSS for DLS/TDLS mode. Additionally, a method and apparatus may be used to alleviate spectrum usage inefficiency in an OBSS environment. The method and apparatus may be used to address the issue of wideband TXOP truncation where the channels involved in communication over the wideband may be released for WTRUs of both the current BSS and any OBSS.

In addition, a method and apparatus may be used for TXOP reservation and truncation for multiple primary bandwidth modes. The methods may include signaling and protocol enhancements for bandwidth and static/dynamic indications when legacy compatibility may not be a requirement or constraint. The methods may also include signaling and protocol enhancements to remedy deficiencies in the basic CF-End mechanism in IEEE 802.11 to truncate a TXOP.

Although the embodiments described hereafter consider the method of reserving the medium using an RTS-CTS frame exchange, it should be understood that the embodiments are not limited to these specific examples, and may be applied to any other type of frame exchange or in a different way, for example, any other MAC protocol for medium reservation and NAV setting. It should also be understood that the drawings are for illustration purposes only and may not be considered as limiting the scope of the embodiments.

A transmitting WTRU may be an IEEE 802.11 WTRU that initiates communication with another IEEE 802.11 WTRU. The communication may be triggered by an RTS frame or any other MAC protocol to reserve the medium and set the NAV. A receiving WTRU may be an IEEE 802.11 WTRU that is the recipient of the data being transmitted by the transmitting WTRU. A neighboring BSS may be a BSS neighboring (overlapping with or interfering with) the BSS to which the transmitting and the receiving WTRUs belong. A neighbor AP/WTRU may be an IEEE 802.11 AP/WTRU that may be a member of the neighboring BSS. The neighbor AP/WTRU may refer to an AP or any WTRU in the neighboring BSS.

A NAV reset may be performed by a neighbor AP/WTRU. The neighbor AP/WTRU may monitor the channels on which an RTS frame was transmitted by the transmitting WTRU. The monitored channels may include a primary channel and/or one or more non-primary channels. If the neighbor AP/WTRU does not detect any activity in the medium on any or all of those channels following the RTS frame, the neighbor AP/WTRU may free the medium for its BSS.

In one embodiment, the neighbor AP/WTRU may monitor these channels for a certain predefined period of time for any activity in order to determine if the medium is being used for communication on those channels. For example, the neighbor AP/WTRU may monitor the primary channel of its BSS, (i.e., the neighboring BSS), which may be a non-primary channel for the BSS of the transmitting WTRU. The neighbor AP/WTRU may monitor this channel for a CTS frame from a receiving WTRU following an RTS frame transmission from the transmitting WTRU. Alternatively, the neighbor AP/WTRU may monitor the channels on which the RTS frame was transmitted by the transmitting WTRU.

The neighbor AP/WTRU may or may not receive the CTS frame transmitted by the receiving WTRU in response to the RTS frame from the transmitting WTRU due to any of the following reasons. The neighbor AP/WTRU may be a hidden node to the receiving WTRU, and hence the CTS frame transmitted by the receiving WTRU may be heard by the transmitting WTRU but not the neighbor WTRU. The CTS frame of the receiving WTRU may be lost due to interference or collision. The receiving WTRU may not have responded to the RTS frame of the transmitting WTRU.

If a CTS frame corresponding to the RTS frame of the transmitting WTRU is not heard after a short inter-frame spacing (SIFS) duration of time, the neighbor AP/WTRU may further monitor the medium for a predetermined additional amount of time to determine if the medium is being used. For example, the neighbor AP/WTRU may monitor the medium for a duration of (SIFS+ΔT) from the reception of an RTS frame. Alternatively, the neighbor AP/WTRU may monitor the medium for an additional (SIFS+ΔT) time duration following the time when the CTS frame was expected. ΔT may be a predefined value or a configurable parameter.

If the medium is found to be idle at the end of a (SIFS+ΔT) duration from the transmission time of the RTS frame, or at the end of a (SIFS+ΔT) duration from the time a CTS frame is expected, the neighbor AP/WTRU may release the medium by resetting the NAV in any or all of the following ways. For example, the neighbor AP/WTRU may transmit a specific frame, for example a contention free (CF)-End frame with the BSS identity (BSSID) field set to its BSSID and the receiver address (RA) field set to the broadcast group address.

Figure 5:
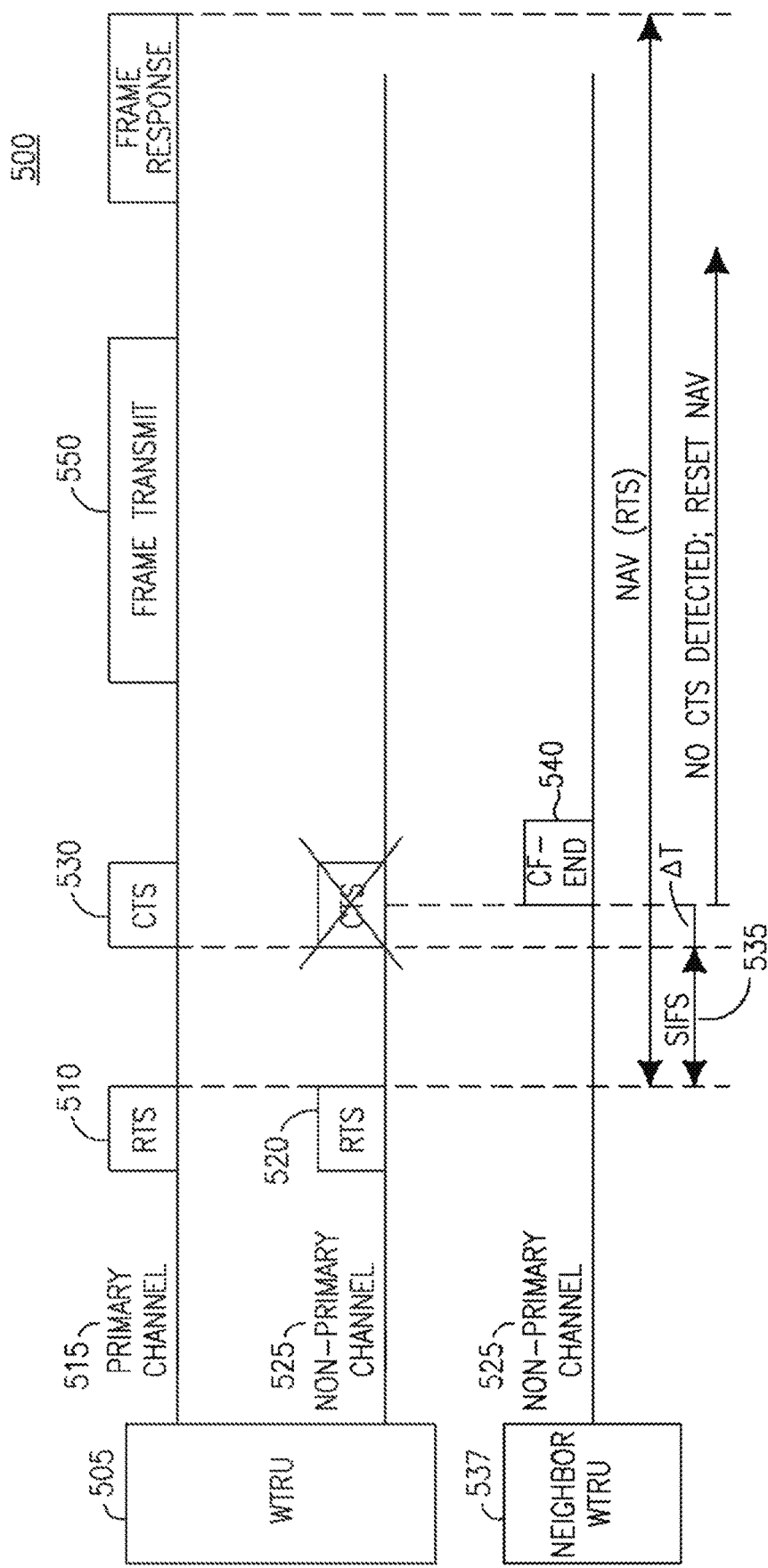
FIG. 5 is a diagram of an example CF-End frame transmission by a neighbor AP/WTRU.

FIG. 5 is a diagram of an example CF-End frame transmission 500 by a neighbor WTRU. In the example shown in FIG. 5, a WTRU 505 may transmit an RTS frame 510 on a primary channel 515, and an RTS frame 520 on a non-primary channel 525. In this example, the WTRU 505 may receive a CTS frame 530 on the primary channel 515 after a SIFS duration 535. If the neighbor WTRU 537 does not receive a CTS frame on the non-primary channel 525 after a (SIFS+ΔT) duration, the neighbor WTRU 537 may transmit a CF-End frame 540 on the non-primary channel 525 to reset the NAV on the non-primary channel. The WTRU 505 may transmit a data frame 550 on the primary channel 515 if the CTS frame 530 was received.

In another example, a new action frame may be defined or any other existing action frame may be modified to reset the NAV. At the end of a monitoring period, if the medium is found to be idle, the neighbor WTRU may transmit the new action frame, or modified existing action frame, that lets other WTRUs in its BSS reset their NAVs.

A NAV reset may be performed by the receiving WTRU. For example, the receiving WTRU may respond to the RTS on the channels where communication may not be possible, in such a way that the WTRUs that set their NAV based on the RTS may reset their NAVs for future communication.

In one example, the receiving WTRU, after receiving an RTS from the transmitting WTRU on the channels that the transmitting WTRU intends to aggregate for wideband transmission, may respond with a CTS frame on those channels where communication is possible and may respond in an alternative manner on the channels where communication may not be possible. The channels where communication may not be possible may be referred to as "non-usable channels" hereafter.

One alternative manner in which the receiving WTRU may respond may be by transmitting a CTS frame even on the non-usable channels. When responding on a non-usable channel, the receiving WTRU may set the Duration field to 0. Any WTRU other than the transmitting WTRU that receives a CTS frame with this Duration value may reset its NAV. Alternatively, the receiving WTRU may set the Duration field in the CTS transmitted on non-usable channels to a value that may be a short duration of time, for example $T_{short}$. $T_{short}$ may be a fixed value or a configurable parameter. Since any WTRU that receives a CTS may set its NAV to the value indicated in the Duration field of the CTS frame, the WTRUs/APs receiving this CTS may backoff for a short duration of time and may be able to access the medium after that. This example may apply to legacy and IEEE 802.11ac WTRUs alike.

In both examples described above, the transmitting WTRU may consider the channel(s) on which a CTS with a duration set to a value other than what is expected for successful communication is received as non-usable. For example, if the Duration field in the CTS frame contains a value other than (Duration field value in the RTS frame—SIFS Time—time required to transmit the CTS frame), the transmitting WTRU may consider the channel(s) on which this CTS frame was received as not available for communication.

In another example, a new action frame may be introduced or an existing action frame may be modified to achieve this purpose. For example, after receiving an RTS from the transmitting WTRU, the receiving WTRU may respond with a CTS on the channels where communication is possible and with the new or modified action frame on the non-usable channels. The WTRUs that receive this new or modified action frame may consider the channel(s) on which this frame was received to be free and available for communication and may reset their NAVs. The transmitting WTRU on reception of this new or modified existing action frame may consider the corresponding channel(s) as unusable.

Figure 6:
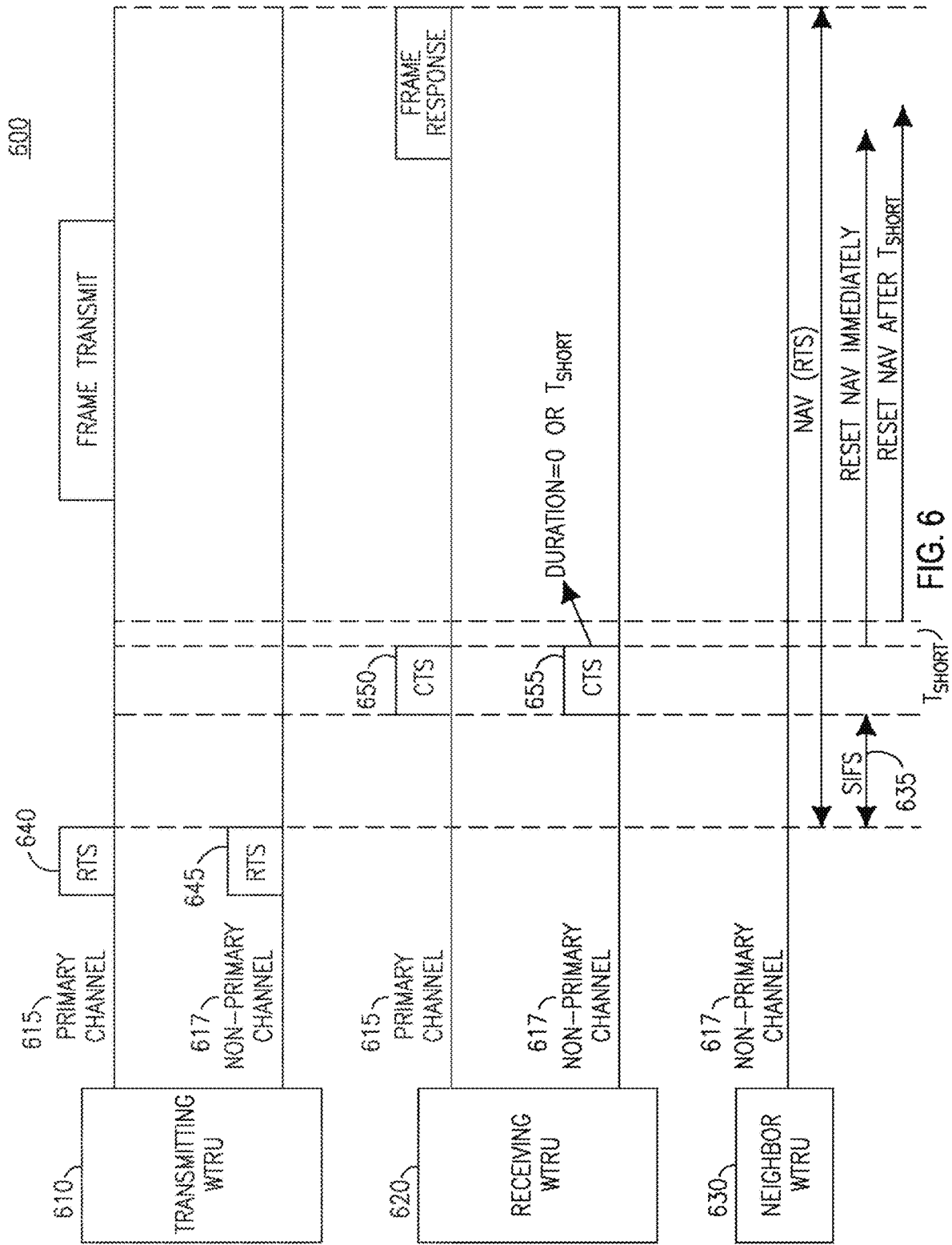
FIG. 6 is a diagram of an example NAV reset by a receiving WTRU.

FIG. 6 is a diagram of an example NAV reset 600 performed by the receiving WTRU in non-usable channels using a CTS frame with the duration field set to 0 or $T_{short}$. FIG. 6 shows a transmitting WTRU 610, a receiving WTRU 620, and a neighbor WTRU 630. The transmitting WTRU 610 may be configured to communicate on a primary channel 615 and a non-primary channel 617. The receiving WTRU 620 may be configured to communicate on the primary channel 615 and the non-primary channel 617. The neighbor WTRU 630 may be configured to communicate on the non-primary channel 617. The transmitting WTRU 610 may transmit an RTS frame 640 on the primary channel 615, and an RTS frame 645 on the non-primary channel 617. The receiving WTRU 620, in response to the RTS frame 640, may transmit a CTS frame 650 on the primary channel 615 after a SIFS duration 635. In response to the RTS frame 645, the receiving WTRU 620 may transmit a CTS frame 655 on the non-primary channel 617 after a SIFS duration 635. The CTS frame 655 may include a Duration field set to 0 or $T_{short}$. The neighbor WTRU 630 may receive the CTS frame 655 on the non-primary channel 617 and reset its NAV immediately or after $T_{short}$ based on the duration indicated by the Duration field.

A wideband TXOP truncation may be performed. A wideband TXOP may be a TXOP for a medium reservation over one or more channels, for example on a primary channel and one or more non-primary channels. In a wideband TXOP truncation example, all or some of the channels involved in communication may be released when the communication terminates before the end of the wideband TXOP duration. A wideband TXOP truncation may allow other WTRUs/APs, including those in an OBSS, to use the medium on any of the channels of the wideband transmission.

The NAV may be set on the primary and non-primary channels by a device to reserve the medium for a wideband TXOP to transmit packet data. The NAV may be set using any allowed mechanism, for example, RTS and CTS frame exchange, transmitting CTS-to-self frames on the primary and non-primary channels, or by any other method such as transmitting IEEE 802.11n based non-HT duplicate packet formats where the same packet may be transmitted simultaneously on primary and non-primary channels. The device may truncate the TXOP with a CF-End frame if it has no more packet data to transmit. The CF-End frame transmitted by a device may include the BSSID of the BSS to which the device belongs or is associated with. The device may transmit a CF-End frame on each of the channels, for example the primary channel and non-primary channels. If the device transmits on a primary channel and non-primary channels, the device may use the non-HT duplicate mode where the CF-End frame may be transmitted simultaneously on the channels. Alternatively, the CF-End frame on a channel may be transmitted with a BSSID that matches the BSSID of the BSS for which the given channel is a primary channel.

The CF-End frame may be transmitted in a wideband packet format by a WTRU truncating its wideband TXOP where the CF-End frame may span the entire bandwidth of the primary and non-primary channels. In this example, the AP of the BSS to which the WTRU belongs may transmit a CF-End frame after an inter-frame duration, for example a SIFS, in response to the CF-End frame from the WTRU in one or more of the following ways. In a first example, the AP may transmit a CF-End frame with its BSSID on the primary channel. In a second example, the AP may transmit a CF-End frame with its BSSID on the primary and non-primary channels, for example in a non-HT duplicate format. In a third example, the AP may transmit a CF-End frame with its BSSID on the primary channel and a CF-End frame on a non-primary channel with the BSSID of the BSS for which the non-primary channel may be the primary channel.

An AP/WTRU may obtain neighbor AP BSSID information. In one example, all APs in the same neighborhood may obtain neighbor AP information explicitly via a wired backbone or control signaling over the wireless interface. The neighborhood may include the same geographical area, and the APs may belong to the same subnet, for example. In another example, the APs may obtain its neighbor AP information implicitly by monitoring different channels.

When an AP receives a CF-End frame from a device in a neighbor BSS on the primary channel of the AP, where the BSSID in the received CF-End frame does not match the BSSID of the AP, the AP may respond by transmitting a CF-End frame after an inter-frame duration, for example, a SIFS duration, with its own BSSID on the primary channel of the AP.

When an AP receives a CF-End frame from a device in the same BSS on the primary channel of the AP, where the BSSID in the received CF-End frame matches the BSSID of the AP, the AP may respond by transmitting a CF-End frame after an inter-frame duration, for example, a SIFS duration, with its own BSSID on the primary channel of the AP.

A CF-End frame with specific parameters may be set to truncate the TXOP on both primary and non-primary channels. For example, one or more parameters of the CF-End frame may be set so that the TXOP may be truncated both on the primary and the non-primary channels efficiently and may result in better usage of the available bandwidth in both the current and the neighbor BSS.

FIG. 7 is a diagram of an example method 700 for transmitting a CF-End frame with a parameter set to truncate the TXOP on both the primary and non-primary channels. If a non-AP WTRU of the BSS under consideration is the TXOP holder, the non-AP WTRU may transmit one of the following to truncate its TXOP: (1) a CF-End frame with the individual/group bit in a timing advance (TA) field set to '0' on the primary channel or on all primary and non-primary channels, or (2) a CF-End frame with the individual/group bit in the TA field set to '1', on the primary channel or on all primary and non-primary channels. Referring to FIG. 7, the AP may receive a CF-End frame 710. The AP may determine 720 whether an individual/group bit in the TA field of the CF-End frame is set to '1'. A CF-End frame with an individual/group bit that is set to '1' may, for example, indicate truncation of the TXOP to all devices, including the OBSS devices, and/or it may indicate a bandwidth in which to transmit the CF-End frame response. If the AP determines that the individual/group bit is set to '1', the AP may respond by transmitting a CF-End frame on the primary and non-primary channels 730. For example, if the individual/group bit is set to '1', the AP may respond on the same channels that the AP received the CF-End frames or on the bandwidth indicated by the received CF-End frame. When the individual/group bit is set to '1', it may indicate that a bandwidth value is set, and/or that a scrambling sequence is included in the frame which signals the bandwidth value. If the AP determines that the individual/group bit is set to '0', the AP may respond by transmitting a CF-End frame on the primary channel 740.

In this example, the AP of the BSS to which the WTRU belongs may transmit a CF-End frame after an inter-frame duration, for example a SIFS, in response to the CF-End frame from the WTRU. Alternatively, if the AP itself is a TXOP holder, it may directly transmit a CF-End frame truncating the TXOP. In both the above cases, the AP may set one or more parameters of the CF-End frame in any or all of the following ways. The AP may transmit the CF-End frame on the primary channel and also the non-primary channels if needed.

The following mechanisms may be adopted independently or in any combination. For example, the AP may set the individual/group bit of the TA field in the CF-End frame to '0' on the primary channel and to '1' on all non-primary channels that may be released, the AP may set the individual/group bit of the TA field in the CF-End frame to '0' on the primary channel, the AP may set the individual/group bit of the TA field in the CF-End frame to '0' on the primary channel and to '0' on all non-primary channels that may be released, the AP may set the individual/group bit of the TA field in the CF-End frame to '1' on all the channels that may be released, (both primary and non-primary channels), and/or the AP may set the duration field of the CF-End frame to a non-zero value.

A WTRU/AP may store the TXOP holder MAC address for the BSS in which it belongs or is associated with. This MAC address may be obtained, for example, from the MAC address included in the frame that initiated a frame exchange sequence or TXOP reservation. The WTRU/AP may determine that the TXOP holder is associated with or belongs to its BSS if either the transmitter or receiver address in the frame, received or transmitted by the TXOP holder, matches the MAC address of the AP of its BSS or BSSID. The WTRU/AP may discard the stored TXOP holder MAC address for its BSS when the NAV timer is zero or is reset. The WTRU/AP may change or update the stored TXOP holder MAC address for its BSS when the NAV timer is set or updated with a new value.

When a non-AP WTRU or AP receives a CF-End frame from a neighbor device on the primary channel of the WTRU, where the BSSID in the received CF-End frame does not match the BSSID of the WTRU, and the individual/group bit in the TA field is set to '1', the WTRU may reset its NAV and consider the medium available for communication. In a variation of this embodiment, the NAV reset may also be conditional upon whether the current NAV was not set by a TXOP holder that belongs to or is associated with its BSS.

When a non-AP WTRU or AP receives a CF-End frame from a neighbor device on the primary channel of the WTRU where the BSSID in the received CF-End frame does not match the BSSID of the WTRU, and the individual/group bit in the TA field is set to '0', the WTRU may reset its NAV and consider the medium available for communication. In a variation of this embodiment the NAV reset may also be conditional upon whether the current NAV was not set by a TXOP holder that belongs to or associated with its BSS.

When an AP receives a CF-End frame from a neighbor device on the primary channel of the AP, where the BSSID in the received CF-End frame does not match the BSSID of the AP but the individual/group bit in the TA field is set to '1', the AP may respond by transmitting a CF-End frame after an inter-frame duration, for example, a SIFS duration, with its own BSSID on the primary channel of the AP. In a variation of this embodiment, the AP response with a CF-End frame may also be conditional upon whether its current NAV was not set by a TXOP holder that belongs to or associated with its BSS. The AP may transmit the CF-End frame after a predetermined duration such as a SIFS, a PIFS, or any other inter-frame duration.

When an AP receives a CF-End frame from a neighbor device on the primary channel of the AP, where the BSSID in the received CF-End frame does not match the BSSID of the AP, and the individual/group bit in the TA field is set to '0', the AP may respond by transmitting a CF-End frame after an inter-frame duration, for example, a SIFS duration, with its own BSSID on the primary channel of the AP. In a variation of this embodiment, the AP response with a CF-End frame may also be conditional upon whether its current NAV was not set by a TXOP holder that belongs to (is associated with) its BSS. The AP may transmit the CF-End frame after predetermined duration such as a SIFS, a PIFS, or any other inter-frame duration.

In the above CF-End frames or CF-End frame sequences, there may be a decision process in the devices that determines if the above CF-End frames or CF-End frame sequences may be accommodated in the remaining duration of the wideband TXOP. The transmission of the CF-End frames or CF-End frame sequences may be conditional on that determination of whether they may be accommodated. For example, the CF-End frames or CF-End frame sequences may not be transmitted if they cannot be accommodated within the initially reserved TXOP duration.

FIG. 8 is a diagram of an example method 800 for wideband TXOP truncation in an OBSS case where an AP 810 may be the TXOP holder. The AP 810 may begin a NAV-set sequence 815 on its primary channel and/or one or more non-primary channels to initiate a TXOP duration 820. The NAV-set sequence 815 may begin after an EDCA channel access period 825. After a SIFS duration 830, the AP 810 may begin an initiator sequence 835. After a SIFS duration 840, the AP 810 may transmit a CF-End frame 845 on its primary channel and/or one or more non-primary channels to indicate truncation of the TXOP. The neighbor AP 850 may transmit a CF-End frame 855 to its BSS WTRUs, on its primary channel after a SIFS duration 860 following the reception of a CF-End frame 845 from the AP 810. The primary channel of the neighbor AP 850 may be a communicating BSS non-primary channel of the AP 810. The CF-End frame 855 may include the BSSID of the neighbor AP 850. This method may aid the WTRUs on previously busy channels in both BSSs to reset their NAVs and release the medium for communication.

Figure 9:
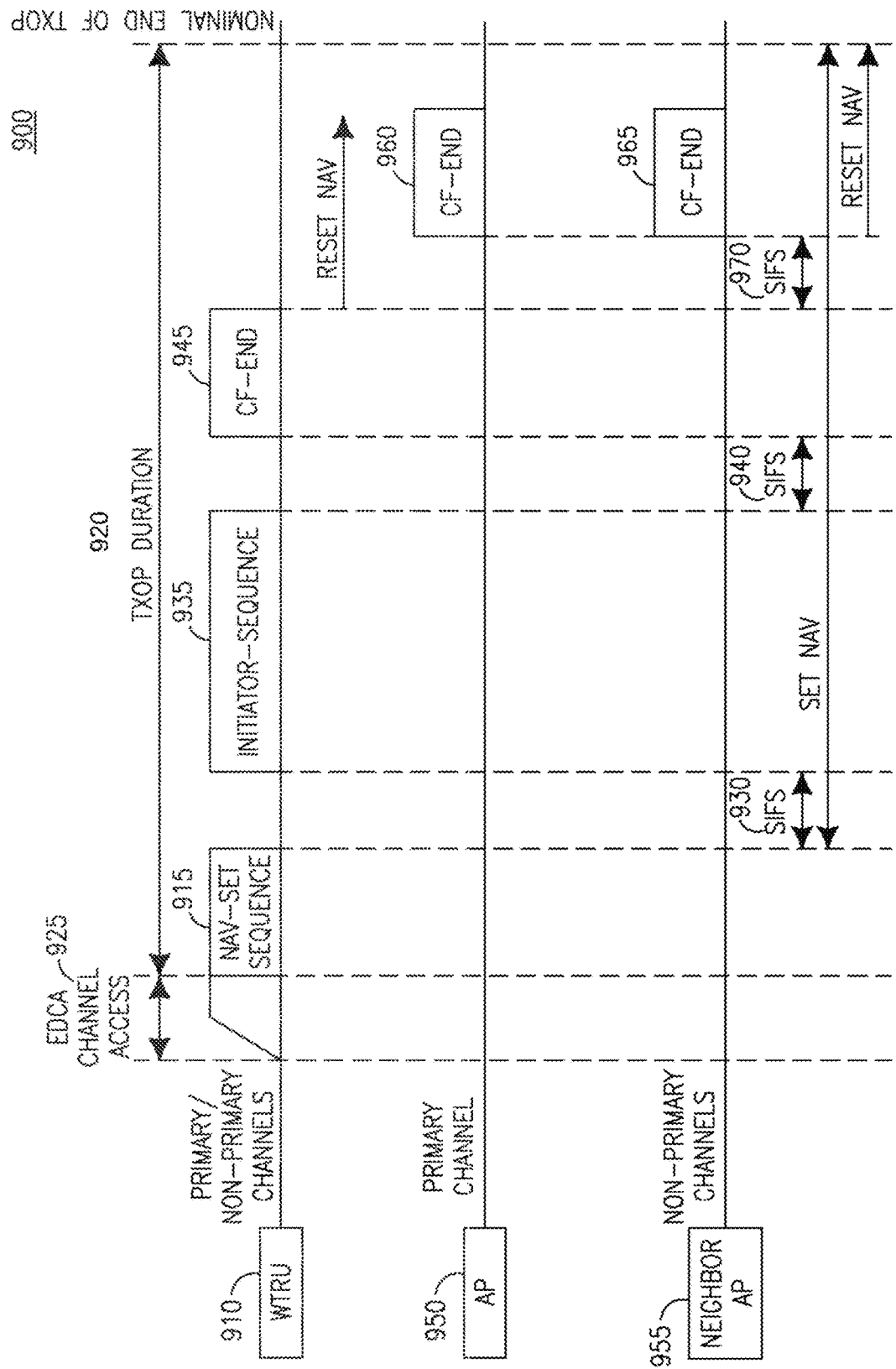
FIG. 9 is a diagram of an example wideband TXOP protocol.

FIG. 9 is a diagram of an example method 900 for wideband TXOP truncation in an OBSS case where a WTRU 910 may be the TXOP holder. The WTRU 910 may begin a NAV-set sequence 915 on its primary channel and/or one or more non-primary channels to initiate a TXOP duration 920. The NAV-set sequence 915 may begin after an EDCA channel access period 925. After a SIFS duration 930, the WTRU 910 may begin an initiator sequence 935. After a SIFS duration 940, the TXOP holding WTRU 910 may transmit a CF-End frame 945 on its primary channel and/or one or more non-primary channels to indicate truncation of the TXOP. The AP 950 of the BSS of this WTRU and the neighbor AP 955 may each transmit a CF-End frame 960, 965 after a SIFS duration 970 following the WTRU 910 CF-End frame transmission. The CF-End frame 960 and the CF-End frame 965 may each include their corresponding BSSID in the frame. This method may aid the WTRUs on previously busy channels in both BSSs to reset their NAVs and release the medium for communication.

A No CF-End frame method may be implemented. In this example, a VHT device, for example, a WTRU or an AP, that does not have any data to transmit before the end of the initially reserved TXOP may not transmit any CF-End frame to truncate the TXOP. This rule may be applied for VHT devices in one or more of the following scenarios in wideband transmission, or all transmissions regardless of whether they may be wideband or not. This example method may be used to achieve fairness in the medium where all the WTRUs and/or APs that set their NAVs at the beginning of the TXOP may continue to back off until the end of the actual TXOP. In this example, since a CF-End frame is not transmitted, the TXOP is not truncated and the remaining TXOP duration after data transmission may be wasted. However since no device may access the channel, a level of fairness may be achieved for all devices.

TXOP protection and truncation in multiple primary bandwidth modes are described below. Some WLAN systems may support multiple primary bandwidth modes of transmission. The multiple bandwidth modes may be supported because sometimes only some bandwidth modes are reliable or feasible for communication because of poor wireless link conditions. The IEEE 802.11ah standard operating in the sub 1 GHz spectrum may have BSSs that support operation of multiple primary bandwidth modes namely, 2 MHz and 1 MHz bandwidth modes. The 1 MHz bandwidth mode may be more reliable for communication and offers a longer range than the 2 MHz bandwidth mode. The devices may support an increased communication range with a robust low rate modulation and coding set with repetition, for example, MCS0-rep2, only in 1 MHz mode. It may be required that all devices are capable of receiving in 2 MHz and 1 MHz modes. Higher transmission bandwidths of 4, 8 and 16 MHz may also be supported in IEEE 802.11ah. TXOP truncation mechanisms for multiple primary bandwidth modes using the 2 MHz and 1 MHz primary bandwidth modes are described as an example for convenience. These mechanisms may apply to a general case of multiple primary bandwidth modes.

In a BSS supporting 2 MHz and 1 MHz primary bandwidth modes, there may be WTRUs that may only transmit or receive using the 1 MHz bandwidth mode. This may be because the WTRUs may be capable of only 1 MHz primary bandwidth mode operation, or the WTRUs may be capable of both 2 MHz and 1 MHz primary bandwidth modes of operation, but have a poor channel link with the other device they are communicating with. In this example, only 1 MHz bandwidth mode operation may be feasible for communication and 2 MHz bandwidth mode transmissions may not be received successfully. Note that the other WTRUs in the BSS may be able to communicate using both 2 MHz and 1 MHz primary bandwidth modes.

Figure 10:
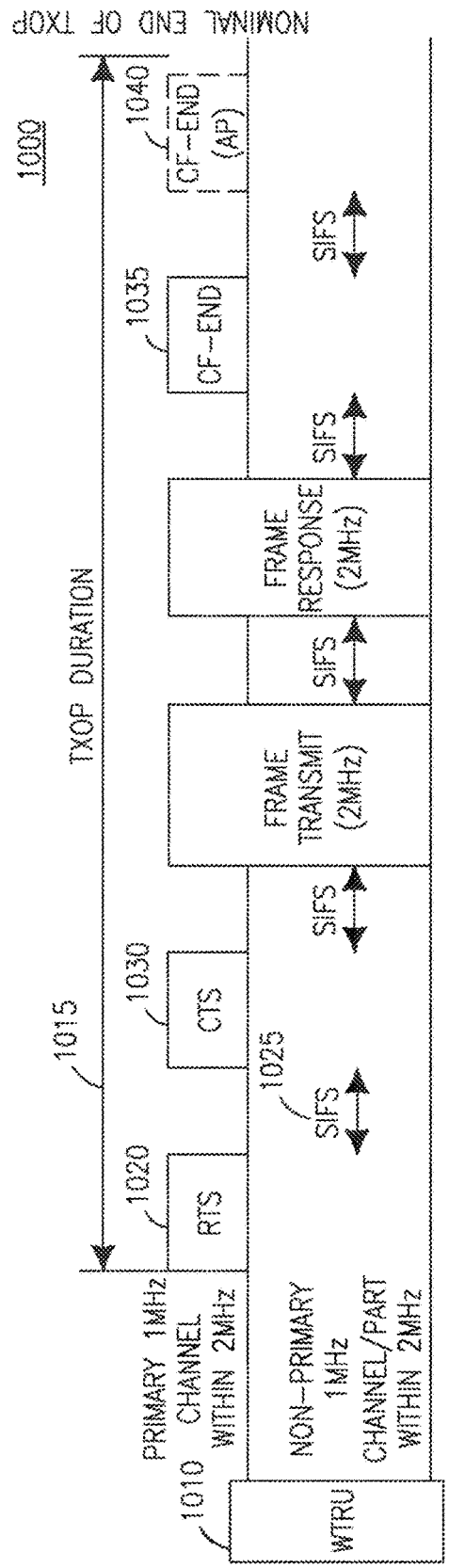
FIG. 10 is a diagram of an example method for a WTRU to obtain a TXOP.

FIG. 10 is a diagram of an example method 1000 for a WTRU 1010 to obtain a TXOP and reserve the medium for a 2 MHz bandwidth mode frame transmission using an RTS/CTS exchange in a 1 MHz bandwidth mode and truncating the TXOP with a CF-End frame in a 1 MHz bandwidth mode. In FIG. 10, a WTRU 1010 may reserve the medium 1015 for a 2 MHz bandwidth mode frame transmission with another device that may be capable of both 2 MHz and 1 MHz bandwidth modes. To obtain a TXOP for a 2 MHz bandwidth mode frame transmission, the WTRU 1010 may conduct an RTS-CTS exchange in the 1 MHz bandwidth mode so that WTRUs that transmit or receive using the 1 MHz bandwidth mode may set their NAV in addition to other WTRUs. The RTS-CTS exchange may include the WTRU 1010 transmitting an RTS frame 1020 on a primary 1 MHz channel within the 2 MHz bandwidth, and receiving, after a SIFS duration 1025, a CTS frame 1030 on the primary 1 MHz channel within the 2 MHz bandwidth in response to the RTS frame 1020. In this example, when the WTRU 1010 has no more data to transmit, the WTRU 1010 may truncate the TXOP with a CF-End frame 1035 transmission in the 1 MHz bandwidth mode so that WTRUs that transmit or receive using the 1 MHz bandwidth mode may reset their NAV in addition to other WTRUs. In response to such a CF-End frame transmission in the 1 MHz bandwidth mode, an AP (not shown) in a BSS may transmit a CF-End frame 1040 in the 1 MHz bandwidth mode so that all WTRUs in the BSS may reset their NAV and thus may mitigate hidden node problems.

Alternatively, the WTRU may truncate the TXOP with a CF-End frame transmission in the 2 MHz bandwidth mode so that the WTRUs that transmit or receive using the 2 MHz bandwidth mode may reset their NAV in addition to other WTRUs. In response to such a CF-End frame transmission in the 2 MHz bandwidth mode, an AP in a BSS may transmit a CF-End frame in the 1 MHz bandwidth mode so that all WTRUs in the BSS may reset their NAV and thus may mitigate hidden node problems.

Figure 11:
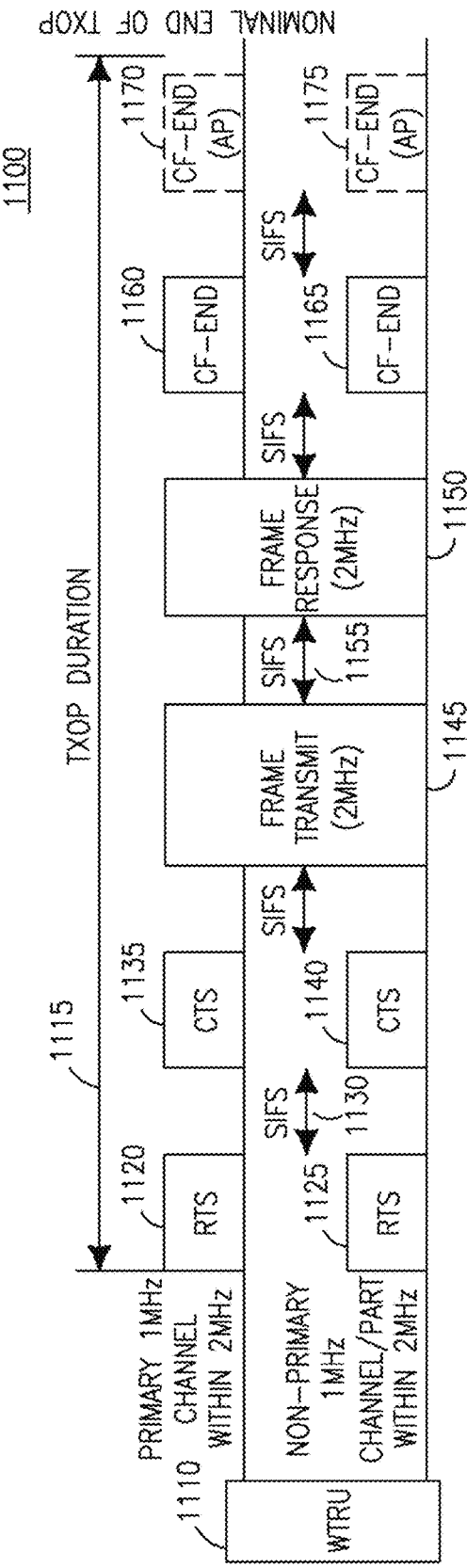
FIG. 11 is a diagram of an example method for a WTRU to obtain a TXOP.

FIG. 11 is a diagram of an example method 1100 for a WTRU 1110 to obtain a TXOP and reserve the medium for a 2 MHz bandwidth mode frame transmission using RTS/

CTS exchange in both 1 MHz parts of the 2 MHz bandwidth and truncating the TXOP with a CF-End frame in both 1 MHz parts of the 2 MHz bandwidth. A neighbor AP or OBSS may camp on or operate on the non-primary 1 MHz part of the 2 MHz primary channel of the given BSS, using the non-primary 1 MHz part as its primary 1 MHz channel.

Referring to FIG. 11, a WTRU 1110 may reserve the medium 1115 for a 2 MHz bandwidth mode frame transmission with another device that may be capable of both 2 MHz and 1 MHz bandwidth modes. To obtain a TXOP for a 2 MHz bandwidth mode frame transmission the WTRU 1110 may conduct an RTS-CTS exchange in both 1 MHz parts of the 2 MHz bandwidth so that WTRUs that transmit or receive using the 1 MHz bandwidth mode may set their NAV in addition to other WTRUs, in its BSS and the OBSS.

The RTS-CTS exchange may include the WTRU 1110 transmitting an RTS frame 1120 on the primary 1 MHz channel within the 2 MHz bandwidth, and transmitting an RTS frame 1125 on the non-primary 1 MHZ channel within the 2 MHz bandwidth. After a SIFS duration, 1130, the WTRU 1110 may receive a CTS frame 1135 on the primary 1 MHz channel within the 2 MHz bandwidth, and receive a CTS frame 1140 on the non-primary 1 MHZ channel within the 2 MHz bandwidth.

The WTRU 1110 may then transmit its data 1145 on the 2 MHz bandwidth, and receive a response 1150 on the 2 MHz bandwidth after a SIFS duration 1155. When the WTRU 1110 has no more data to transmit, the WTRU 1110 may truncate the TXOP with a CF-End frame transmission 1160, 1165 in both 1 MHz parts of the 2 MHZ bandwidth or at least in the primary 1 MHz channel within the 2 MHz bandwidth, so that WTRUs that transmit or receive using the 1 MHz bandwidth mode may reset their NAV in addition to other WTRUs, in its BSS and the OBSS, or in the 2 MHz bandwidth mode. In response to such a CF-End frame transmission an AP (not shown) in a BSS may transmit a CF-End frame 1170, 1175 in both 1 MHz parts of the 2 MHz bandwidth so that all WTRUs in its BSS and OBSS may reset their NAV and thus may mitigate hidden node problems.

Figure 12A:
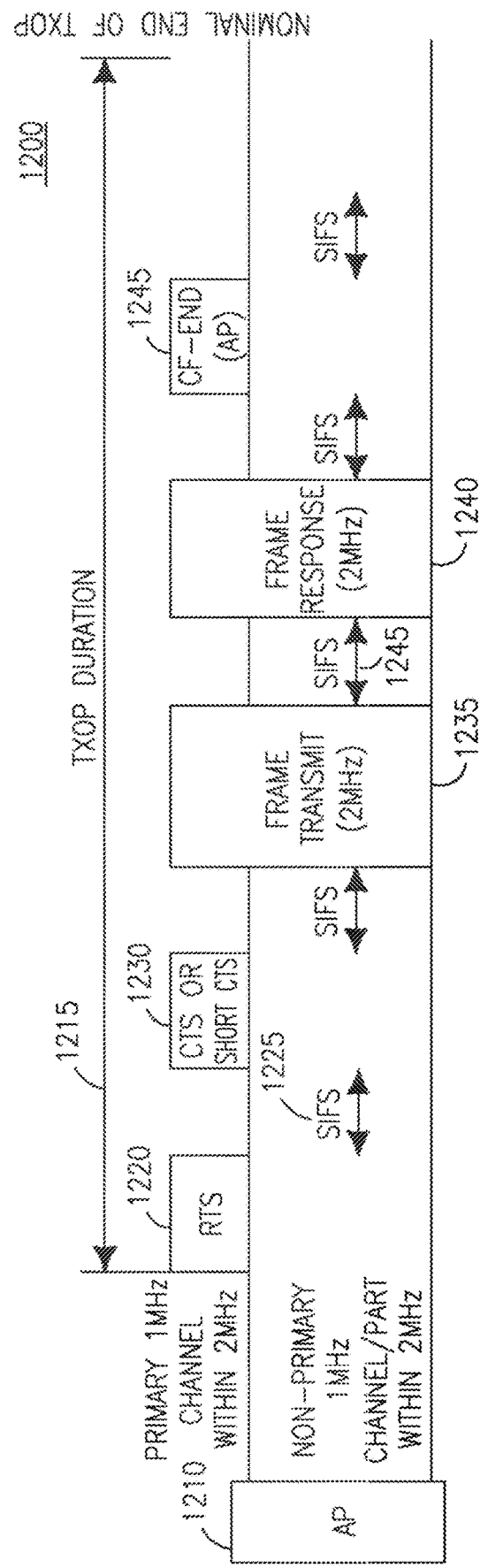
FIG. 12A is a diagram of an example method for an AP to obtain a TXOP.

FIG. 12A is a diagram of an example method 1200 for an AP 1210 to obtain a TXOP 1215 and reserve the medium for a 2 MHz bandwidth mode frame transmission using an RTS/CTS exchange in a 1 MHZ bandwidth mode and truncating the TXOP with a CF-End frame in the 1 MHz bandwidth mode. In FIG. 12A, the AP 1210 may reserve the medium for a 2 MHz bandwidth mode frame transmission with a WTRU (not shown) that may be capable of both 2 MHz and 1 MHz bandwidth modes. To obtain a TXOP 1215 for a 2 MHz bandwidth mode frame transmission, the AP may conduct an RTS-CTS exchange in the 1 MHz bandwidth mode so that WTRUs that transmit or receive using the 1 MHz bandwidth mode may set their NAV in addition to other WTRUs. The RTS-CTS exchange may include the AP 1210 transmitting an RTS frame 1220 on a primary 1 MHz channel within the 2 MHz bandwidth, and receiving, after a SIFS duration 1225, a CTS frame 1230 on the primary 1 MHz channel within the 2 MHz bandwidth in response to the RTS frame 1220. The CTS frame 1230 may be a short CTS frame. A short CTS frame may be a shortened version of the CTS frame. The short CTS frame may only include a PHY preamble, and may not include MAC layer fields. The frame format of the short CTS may comprise a short training field (STF), a long training field (LTF) and a signal (SIG) field in that order. The SIG field of the short CTS frame may include an indication that the frame is a short CTS frame. The short CTS frame may include other indications or signaling requirements for the short CTS frame such as CTS ID to indicate the intended receiver of the CTS, a bandwidth when the CTS may need to indicate the available bandwidth at the receiver side within the bandwidth indicated by RTS, and a duration for NAV setting.

The AP 1210 may then transmit its data 1235 on the 2 MHz bandwidth, and receive a response 1240 on the 2 MHz bandwidth after a SIFS duration 1245. When the AP 1210 has no more data to transmit, the AP 1210 may truncate the TXOP 1215 with a CF-End frame 1245 in the 1 MHz bandwidth mode so that WTRUs that transmit or receive using the 1 MHz bandwidth mode may reset their NAV in addition to other WTRUs.

Figure 12B:
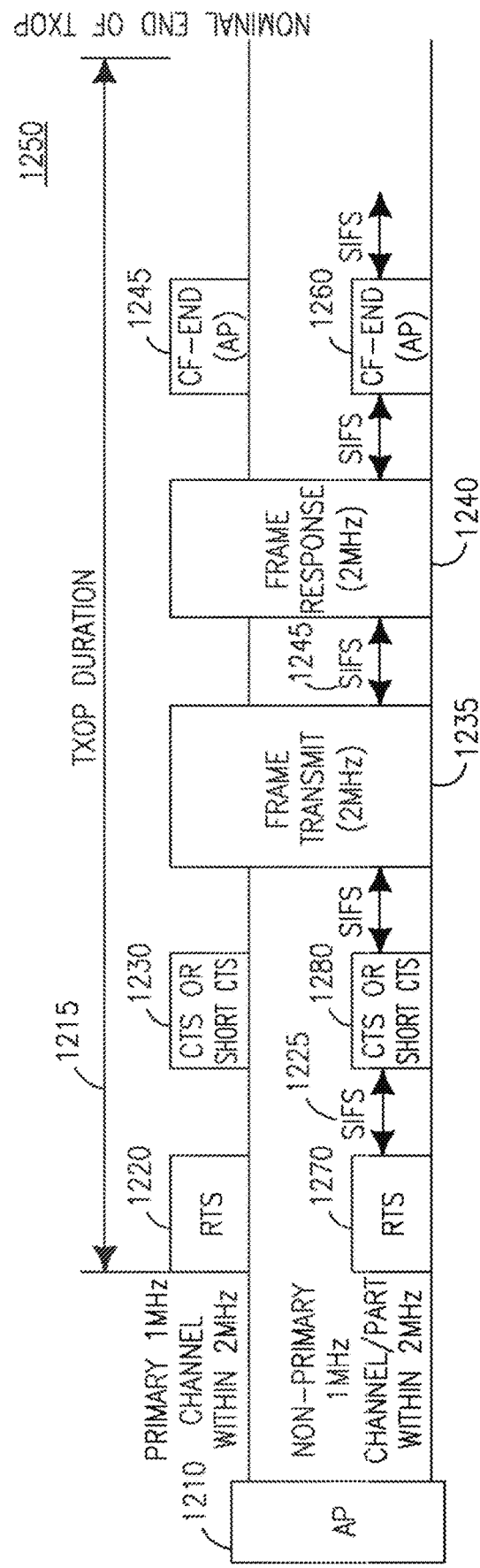
FIG. 12B is a diagram of another example method for an AP to obtain a TXOP.

FIG. 12B is a diagram of an example scenario 1250 where a neighbor AP or OBSS may camp on or operate on the non-primary 1 MHz part of the 2 MHz primary channel of the given BSS, using non-primary 1 MHZ part as its primary 1 MHz channel. In this example, an AP may reserve the medium for a 2 MHz bandwidth mode frame transmission with an RTS/CTS exchange in both 1 MHz parts of the 2 MHz bandwidth and truncate the TXOP with a CF-End frame in both 1 MHz parts of the 2 MHz bandwidth. To handle such a scenario, the AP 1210 may transmit another CF-End frame 1260 simultaneously on the non-primary 1 MHz channel/part within the 2 MHz to reset the NAV for WTRUs in a neighbor BSS or OBSS. In addition, to obtain a TXOP 1215 for a 2 MHz bandwidth mode frame transmission, the AP 1210 may conduct an RTS-CTS exchange in both 1 MHz parts of the 2 MHz bandwidth so that WTRUs that transmit or receive using the 1 MHz bandwidth mode may set their NAV in addition to other WTRUs, in its BSS and the OBSS. For example, the AP 1210 may transmit an RTS frame 1270 on the non-primary 1 MHz part within the 2 MHz bandwidth, and receive a CTS frame 1280 after a SIFS duration 1225. The CTS frame 1280 may be a short CTS frame.

In the above embodiments, the RTS and CTS frames transmitted in the 1 MHz bandwidth mode may include one or more indicators that indicate the transmission bandwidth mode for which TXOP or medium reservation is requested. The one or more indicators may indicate a 2 MHz or a 1 MHz bandwidth mode for which a TXOP is requested. Such indicators may be included in any part of the frame, for example, in the signal (SIG) field of the physical layer (PHY) preamble, the MAC header, or scrambling sequence used in the frame. This may be useful in scenarios where unused bandwidth may be reused.

In the above embodiments, the CF-End frames transmitted in the 1 MHz bandwidth mode may include one or more indicators that indicate that the TXOP being truncated is for a given bandwidth mode. The one or more indicators may indicate a 2 MHz or a 1 MHz bandwidth mode for which a TXOP is being truncated. Such indicators may be included in any part of the frame, for example, in the SIG field of a PHY preamble, the MAC header, or scrambling sequence used in the frame. This may be useful in scenarios where unused bandwidth may be reused.

In one embodiment of signaling bandwidth information in frames which may be used for RTS, CTS and CF-End frames, a device may set the individual/group bit in the TA field of a frame to '0' to indicate a 1 MHz bandwidth. Alternatively, the device may set the individual/group bit in the TA field of a frame to '1' to indicate a 2 MHz or higher bandwidth, for example 4 MHZ, 8 MHZ, or 16 MHz, where the actual bandwidth may be signaled in combination with other indications. An example indication may include a scrambling sequence used in the frame. In such an example, 1 bit may be used to indicate static and dynamic bandwidth and 2 bits may be used to indicate 2 MHZ, 4 MHZ, 8 MHZ, and/or 16 MHz.

In the above embodiments, the CF-End frames may have the individual/group bit in the TA field of the CF-End frame be set appropriately according to the mechanisms discussed earlier.

The RTS-CTS exchange mechanism examples in the above embodiments, when applied to wideband transmissions, for example, 4 MHZ, 8 MHZ, or 16 MHZ, may be repeated. These wideband transmissions may be repeated using the non-HT duplicate format in each primary mode bandwidth, for example, two 2 MHZ bandwidths within a 4 MHz wideband.

In a variation of the embodiments above, the RTS-CTS frame exchange sequence may be replaced by any other valid NAV setting frame sequence exchange such as a CTS-to-self, a short CTS-to-self frame, an initial frame, or a data packet. An initial frame may be an initiating frame such as a PSMP frame or a Null Data Packet Announcement frame for channel sounding purposes. In order to obtain a TXOP for a 2 MHz bandwidth mode frame transmission, a WTRU may transmit a CTS-to-self frame in the 1 MHz bandwidth mode so that WTRUs that only transmit or receive using the 1 MHz bandwidth mode may set their NAVs in addition to other WTRUs. In the above embodiments the RTS-CTS frame exchange may be also be replaced by an RTS-short CTS frame exchange.

Even though the above embodiments have been described with the 2 MHz and 1 MHz primary bandwidth modes as an example for convenience, they may be applicable to the general case of multiple primary bandwidth modes. The 1 MHz primary bandwidth mode may represent more reliable primary bandwidth modes or the most reliable primary bandwidth mode, for example, MCS0-Rep2 PHY transmission mode of 1 MHz in IEEE 802.11ah, and the 2 MHz primary bandwidth mode may represent higher primary bandwidth modes that may be less reliable for communication. An MCS02-Rep2 transmission may use BPSK modulation with ½ code rate and two times repetition. In this example, the RTS-CTS frames and the CF-End frames may be signaled in the more reliable primary bandwidth modes or in the most reliable primary bandwidth mode, for example, MCS0-Rep2 PHY transmission mode of 1 MHz in IEEE 802.11ah.

An 802.11ah BSS may support both 1 MHz and 2 MHz primary modes of operation. Therefore it may need some channel selection methods for the BSS. The AP may follow one or more of the following methods to establish an 802.11ah BSS. These methods may aid in the coexistence of two or more BSSs in the same neighborhood. In one example, the primary 1 MHZ, 2 MHZ, 4 MHz or 8 MHz channel for an 802.11ah AP may be the channel within the operating channel width of the BSS that is used to transmit 1 MHZ, 2 MHZ, 4 MHz or 8 MHz frames/packets, respectively.

A secondary 1 MHz channel for an 802.11ah AP with a 2 MHz operating channel width may be a 1 MHz channel in its operating channel width that does not overlap with its primary 1 MHz channel. A secondary 2 MHz channel in an 802.11ah BSS may be a 2 MHz subchannel adjacent to the primary 2 MHz channel that together form the primary 4 MHz channel. A secondary 4 MHz channel in an 802.11ah BSS may be a 4 MHz subchannel adjacent to the primary 4 MHz channel that together form the primary 8 MHz channel. A secondary 8 MHz channel in an 802.11ah BSS may be an 8 MHz subchannel adjacent to the primary 8 MHz channel that together form the primary 16 MHz channel.

An AP may scan a set of channels that are potentially affected by 802.11ah BSS operation for existing BSSs before starting an 802.11ah BSS. The AP may scan a channel for a specific duration and more than once if needed. If an AP starts an 802.11ah BSS that occupies some or all channels of any existing BSSs, the AP may select a primary channel of the new 802.11ah BSS such that a primary 2 MHz channel may be identical to the 2 MHZ primary channel of any one of the existing BSSs or a primary 1 MHz channel may be identical to the 1 MHz primary channel of any one of the existing BSSs.

In a BSS with a 4 MHZ, 8 MHZ, or 16 MHz operating channel width, the selected 2 MHz primary channel, from among the channels on which no beacons are detected during scanning, may not be identical to the secondary 2 MHz channel of any existing BSSs with a 4 MHZ, 8 MHz or 16 MHz operating channel width and/or may not overlap with the secondary 4 MHz channel of any existing BSSs with a 16 MHz operating channel width. In a BSS with a 2 MHz operating channel width, the selected 2 MHz primary channel, from among the channels on which no beacons are detected during scanning, may not be identical to the secondary 2 MHz channel of any existing BSSs with a 4 MHZ, 8 MHz or 16 MHz operating channel width and/or may not overlap with the secondary 4 MHz channel of any existing BSSs with a 16 MHz operating channel width. In a BSS with a 1 MHz operating channel width, the selected 1 MHz primary channel, from among the channels on which no beacons are detected during scanning, may not overlap with the secondary 2 MHz channel of any existing BSSs with a 4 MHZ, 8 MHz or 16 MHz operating channel width and/or may not overlap with the secondary 4 MHz channel of any existing BSSs with a 16 MHz operating channel width.

An AP operating in an 802.11ah BSS with a 4 MHZ, 8 MHz or 16 MHz operating channel width, in response to detecting a BSS in the neighborhood whose primary channel is the secondary 2 MHz channel of the AP, may switch to 2 MHz operating channel width and/or move to a different channel set. An AP operating in an 802.11ah BSS with a 2 MHZ, 4 MHZ, 8 MHz or 16 MHz operating channel width, in response to detecting a BSS in the neighborhood whose primary channel is the secondary 1 MHz channel of the AP, may switch to 1 MHz operating channel width and/or move to a different channel set.

In a spectrum where legacy devices operate, for example, as in IEEE 802.11ac devices operating in a 5 GHz bandwidth with legacy IEEE 802.11n devices, the bandwidth and static/dynamic indications may support compatibility with legacy devices. The bandwidth and static/dynamic indications may be used in control frames, for example, in RTS and CTS exchanges for wideband TXOP reservation. Because of the constraint for legacy support, the bandwidth and static/dynamic indications for IEEE 802.11ac were designed so that the last three bits within the first 7 bits of the scrambling sequence used in a frame may be used for bandwidth and static/dynamic indications. One bit may be used for a static/dynamic indication, and two bits may be used for a bandwidth indication of 20 MHZ, 40 MHZ, 80 MHz or 160 MHz/80 MHz+80 MHz. To indicate that the first 7 scrambled bits are modified the individual/group bit in the TA field of the control frame, for example, an RTS frame, may be set to 1.

Using the three bits in the scrambling sequence for signaling may reduce the effectiveness of the scrambling function. This problem may be eliminated by exploiting the fact that in the new spectrum being allocated for a WLAN, for example, below 1 GHz as in IEEE 802.11ah, there is no requirement of compatibility with legacy devices. Two bits in the SIG field of the PHY preamble may be used for a bandwidth indication of 2 MHZ, 4 MHZ, 8 MHz or 16 MHz/8 MHz+8 MHz. Note that the bandwidths of IEEE 802.11ah may be obtained from IEEE 802.11ac by scaling down with a factor of 10. To indicate whether the bandwidth is Static/Dynamic an individual/group bit may be included in the TA field of the control frame, for example, the bit may be set to 1 to indicate a dynamic bandwidth and 0 to indicate a static bandwidth.

In another method of signaling bandwidth information for 1 MHZ, 2 MHZ, 4 MHZ, 8 MHZ, and 16 MHZ, a device may set the individual/group bit in the TA field of a frame to '0' to indicate a 1 MHz bandwidth. Alternatively, the device may set the individual/group bit in the TA field of a frame to '1' to indicate a 2 MHz or higher bandwidth, for example, 4 MHZ, 8 MHZ, or 16 MHz, where the actual bandwidth may be signaled in combination with other indications, for example, in a scrambling sequence used in the frame. In this example, 1 bit may be used to indicate static and dynamic bandwidth and 2 bits may be used to indicate 2 MHZ, 4 MHZ, 8 MHZ, and 16 MHz.

The WTRU/AP behavior for this solution is as follows. A WTRU/AP may set the individual/group bit in the TA field of a control frame to indicate static/dynamic bandwidth, for example, the bit may be set to 1 to indicate dynamic bandwidth and 0 to indicate static bandwidth. A WTRU/AP may set the two bits for a bandwidth indication of 2 MHZ, 4 MHZ, 8 MHz or 16 MHz/8 MHz+8 MHz in the SIG field of the PHY preamble of a control frame. Thus, in a wideband TXOP reservation protocol exchange, a WTRU/AP may transmit an RTS with three bits set as described above to indicate the desired bandwidth and whether it is static/dynamic. In response to this in the static case, a WTRU/AP may transmit a CTS frame including a bandwidth indication, if all of the bandwidth is available as requested in the RTS. In the dynamic case, a WTRU/AP may respond by transmitting a CTS frame including a bandwidth indication on the available channels in the bandwidth requested/indicated in the RTS frame.

Even though the above embodiments have been described with the 2 MHz primary bandwidth mode as an example for convenience, the embodiments may be applicable to the general case of any primary bandwidth mode.

Solutions are described herein that may provide a remedy for the deficiencies in the basic truncation of TXOP mechanism using CF-End frames.

Figure 13:
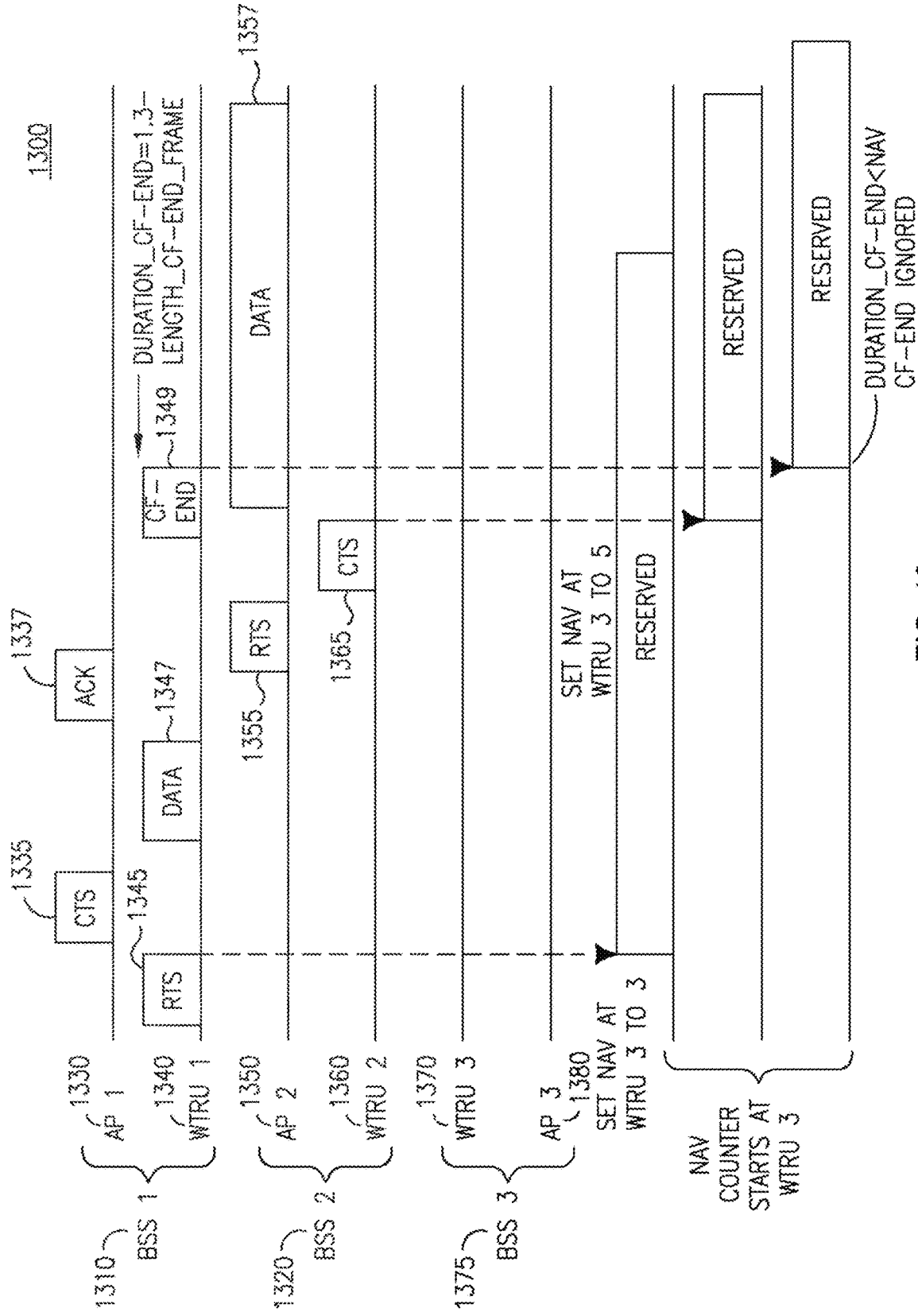
FIG. 13 is a diagram of an example packet exchange sequence.

As described in FIG. 4, the NAV counter at WTRU3 may be prematurely cancelled when it receives a CF-End frame from a first WTRU, although the most recent value of the NAV counter at the first WTRU may have been updated by a medium reservation frame from another WTRU that may be out of the radio range of the first WTRU. FIG. 13 is a diagram of an example packet exchange sequence 1300 similar to the one illustrated in FIG. 4, however, with the enhancement such that the NAV counter at the other WTRU may no longer be cancelled prematurely due to the extra check on the duration field of the CF-End frame by the receiving WTRUs of the CF-End frame.

FIG. 13 shows a first BSS (BSS1) 1310 and a second BSS (BSS2) 1320. As shown in FIG. 13, AP1 1330 and WTRU1 1340 may belong to BSS1 1310; AP2 1350 and WTRU2 1360 may belong to BSS2 1320; and WTRU3 1370 may belong to BSS1 1310 or it may belong to another overlapping BSS (OBSS) BSS3 1375 started by AP3 1380.

As shown in FIG. 13, at T=0 ms, WTRU1 1340 may transmit an RTS frame 1345 to reserve the medium for 3 ms, and set the NAV counter at WTRU3 1370 to be 3 ms. AP1 1330 may respond with a CTS frame 1335, after which the WTRU1 1340 may start to transmit its data frame 1347 to AP1 1330. AP1 1330 may subsequently transmit an acknowledgement (ACK) 1337 of the reception of the data packet 1347. At time T=1.5 ms, AP2 1350, without being able to hear the ACK 1337 transmitted by AP1 1330, may transmit an RTS frame 1355 to WTRU2 1360. When WTRU2 1360 receives the RTS frame 1355 from AP2 1350, it may respond with a CTS frame 1365 to reserve the medium for 5 ms, and may update the NAV counter at WTRU3 1370 to be 5 ms. AP2 1350, after receiving the CTS frame 1365 from WTRU2 1360, may start transmitting its data packet 1357 for WTRU2 1360. At T=1.7 ms, WTRU1 1340, which may have finished all of its transmissions, may transmit a CF-End frame 1349 to indicate truncation of its TXOP. In this example method, a value may be included in the duration field of the CF-End frame 1349, which may be currently set to "0". When WTRU1 1340 completes all transmissions and still has a TXOP remaining, it may transmit the CF-End frame 1349 with its duration field set as follows:

$$\text{Duration}\_CF\text{-End} = \text{Remainder}\_TXOP - \text{Length}\_CF\text{-End}\_\text{Frame}, \quad \text{Equation(2)}$$

where Remainder_TXOP is the time remaining in the TXOP of which the holder is the transmitting WTRU of the CF-End frame, and Length_CF-End_Frame is the length in time of the CF-End frame.

WTRU3 1370 may receive CF-End frame 1349 and compare its NAV counter value to the duration value contained in the CF-End frame 1349. If NAV≤Duration_CF-End, NAV is set to 0. Alternatively, NAV is set to 0 if NAV=Duration_CF-End. Otherwise, the received CF-End frame may be ignored. Note that an AP may transmit a CF-End frame with its duration field set as Duration_CF-End=Remainder_TXOP-Length_CF-End_Frame to indicate truncation of its TXOP.

In a second example, an additional NAV counter referred to as Previous NAV value (P_NAV) may be used in the MAC Layer of WTRUs, where P_NAV may be used to set the duration field of the CF-End frame to "Remainder_TXOP-Length_CF-End_Frame". The P_NAV counter may be used to record previous NAV counter values which may in turn be used to prevent premature cancellation of medium reservations. By definition, P_NAV≤NAV. The P_NAV counter, if its value is non-zero, may follow the same count-down process as the NAV counter.

The AP/WTRU behavior may be as follows. When an AP/WTRU receives a packet P that contains medium reservation time T, it may compare its P_NAV, NAV values to the value of T. For example, for NAV>T, if P_NAV>T, ignore P. Otherwise, set P_NAV=T. In another example, for NAV=T, if P_NAV<T, set P_NAV=T. Otherwise, ignore P. In yet another example, for NAV<T, set P_NAV=NAV, and set NAV=T. These examples may include an adjustment for timing inaccuracies, propagation delays and clock drifts, and the like.

When a WTRU or AP completes all transmissions and still has TXOP left, it may transmit a CF-End frame with its Duration Field set to the value Duration_CF-End=Remainder_TXOP-Length_CF-End_Frame. When a WTRU receives a CF-End frame, it may compare its P_NAV, NAV counter values to the duration value included in the CF-End frame.

In a NAV<Duration_CF-End example, the received CF-End frame may be ignored. For NAV=Duration_CF-End, if P_NAV #0, the WTRU may set NAV=P_NAV and set P_NAV=0. If P_NAV=0, the WTRU may set NAV=0.

In a NAV>Duration_CF-End example, if P_NAV>Duration_CF-End, the received CF-End frame may be ignored. If P_NAV=Duration_CF-End, the WTRU may set P_NAV=0. If P_NAV<Duration_CF-End, the received CF-End frame may be ignored. These examples may include an adjustment for timing inaccuracies, propagation delays and clock drifts, and the like.

Figure 14:
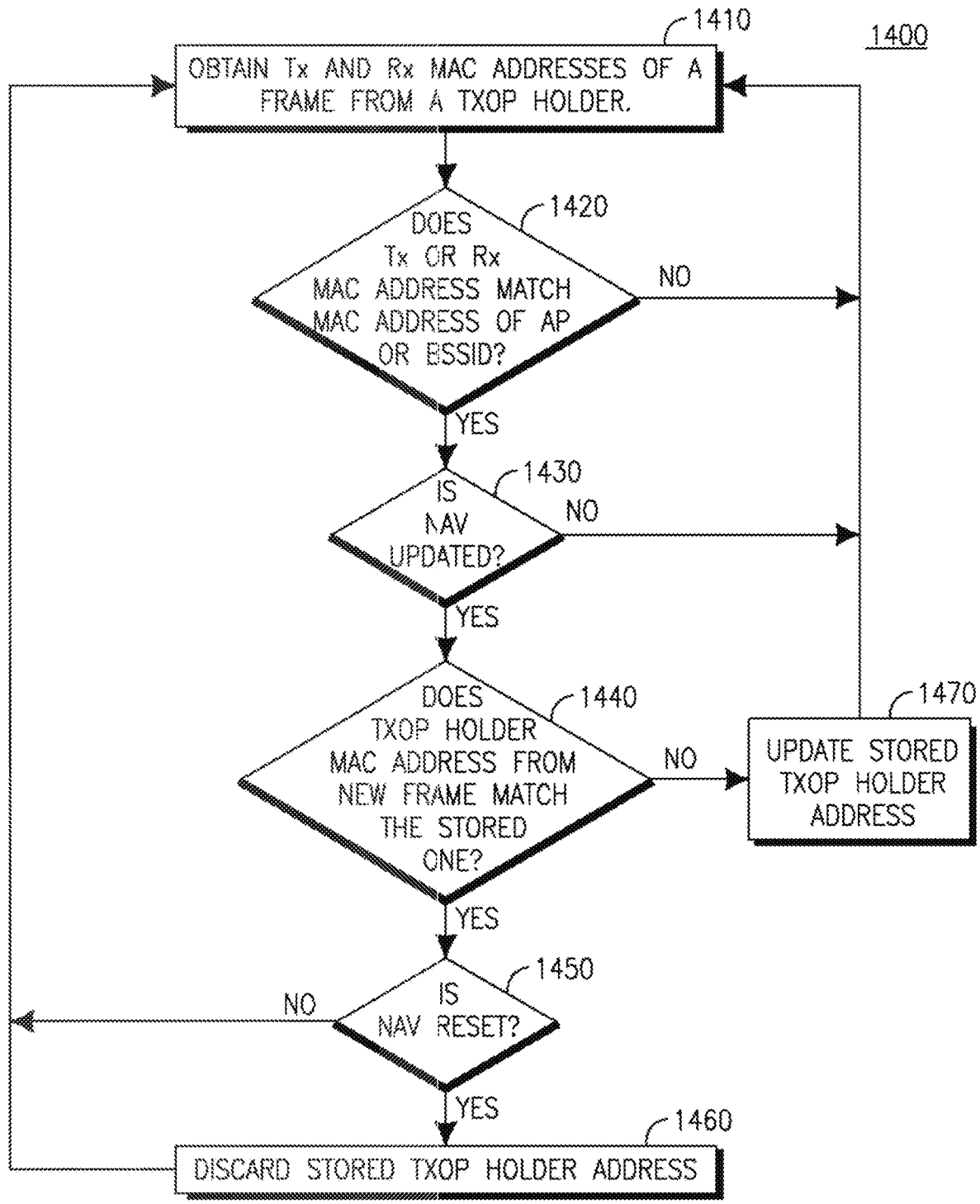
FIG. 14 is a diagram of an example method for a WTRU/AP storing or saving the TXOP holder MAC address for the BSS in which it belongs or is associated.

FIG. 14 is a diagram of an example method 1400 for a WTRU/AP storing or saving the TXOP holder MAC address for the BSS in which it belongs or is associated. Referring to FIG. 14, the WTRU/AP may obtain 1410 a transmit (Tx) and receive (Rx) MAC address of a frame from a TXOP holder. This MAC address may be obtained for example from the MAC address included in the frame that initiated a frame exchange sequence or TXOP reservation. The WTRU/AP may determine 1420 whether the TXOP holder is associated with or belongs to its BSS if either the Tx or Rx MAC address in the frame received or transmitted by the TXOP holder matches the MAC address of the AP of its BSS or BSSID.

The WTRU/AP may determine 1430 whether the NAV is updated if the Tx or Rx MAC address matches the MAC address of the AP or BSSID. If the NAV is updated, the WTRU/AP may determine 1440 whether the TXOP holder MAC address from the frame matches a stored MAC address. If the TXOP holder MAC address matches a stored MAC address, the WTRU/AP may determine 1450 whether the NAV timer has been reset. If the NAV timer is zero or has been reset, the WTRU/AP may discard 1460 the TXOP holder MAC address. If the TXOP holder MAC address does not match a stored MAC address, the WTRU/AP may change or update 1470 the stored TXOP holder MAC address for its BSS when the NAV timer is set or updated with a new value.

In an example variation of this embodiment, a WTRU/AP may also store/save and maintain the TXOP holder MAC address when the TXOP holder does not belong to its BSS. This may be separate from the saved or stored TXOP holder MAC address for its BSS. The WTRU/AP may determine that the TXOP holder is not associated with, or does not belong to, its BSS if neither the transmitter nor receiver address in the frame received or transmitted by the TXOP holder matches the MAC address of the AP of its BSS or BSSID.

In this example, the WTRU/AP may maintain a BSS NAV and a Non-BSS NAV. The BSS NAV may be set or updated when the TXOP holder is associated with the same BSS as the WTRU/AP. The non-BSS NAV may be set or updated when the TXOP holder is not associated with the same BSS as the WTRU/AP. The WTRU/AP may attempt to initiate medium access procedure only if both of its NAVs, BSS NAV and Non-BSS NAV timers are zero or reset.

The WTRU/AP behavior for this solution is described below. If a WTRU/AP receives a CF-End frame with a BSSID that does not match its own then it may not reset its BSS NAV and may reset its non-BSS NAV. If a WTRU/AP receives a CF-End frame with a BSSID that does match its own, then it may reset its BSS NAV and may not reset its non-BSS NAV.

In another example variation of this embodiment, if a WTRU receives a CF-End frame with a BSSID that does match its own, then it may reset its BSS NAV, and may reset its non-BSS NAV. This behavior may be implemented as part of the system design or made configurable as part of deployment or operation that is configurable by AP for the entire BSS, or configurable by WTRU/AP autonomously. Essentially, this variation of the embodiment may allow aggressive operation of devices by ignoring neighbor BSS transmissions.

In another example, if a WTRU/AP receives a CF-End frame with a BSSID that does not match its own, then it may not reset its NAV if the NAV was set by a TXOP holder that does belong to the same BSS. Moreover, the WTRU/AP may reset the NAV if the NAV was not set by a TXOP holder in the same BSS. Note that a WTRU/AP may store the TXOP holder address for the BSS, and therefore may know whether the current NAV was set by a TXOP holder that belongs to its BSS or not.

If a WTRU/AP receives a CF-End frame with a BSSID that does match its own, then it may reset the NAV if the NAV was set by a TXOP holder in the same BSS. Moreover, the WTRU/AP may not reset its NAV if the NAV was not set by a TXOP holder that belongs to the same BSS. Note that a WTRU/AP may store the TXOP holder address for the BSS and therefore may know whether the current NAV was set by a TXOP holder that belongs to its BSS or not.

In a variation of this embodiment, if a WTRU receives a CF-End frame with a BSSID that does match its own, then it may reset the NAV if the NAV was set by a TXOP holder in the same BSS. Moreover, the WTRU may reset its NAV if the NAV was not set by a TXOP holder that belongs to the same BSS. This behavior may be implemented as part of the system design or made configurable as part of deployment or operation that is configurable by AP for the entire BSS, or configurable by a WTRU/AP autonomously. This variation of the embodiment may allow aggressive operation of devices by ignoring neighbor BSS transmissions.

In all of the above proposed embodiments, a device may transmit a CF-End frame if there is sufficient time left in the TXOP duration to accommodate the CF-End frame duration and associated SIFS duration. There may be a decision process in the devices that determines if the above CF-End frames or CF-End frame sequences may be accommodated in the remaining duration of the wideband TXOP. The transmission of the CF-End frames or CF-End frame sequences may be conditional on that determination of whether they may be accommodated. For example, the CF-End frames may not be transmitted if they cannot be accommodated within the initially reserved TXOP duration.

In all of the above proposed mechanisms/embodiments, when a WTRU/AP receives a CF-End with a non-matching BSSID, may take further action to clear its NAV based on a check that its NAV was not set by a device in its own BSS. In all the above proposed embodiments, when an AP receives a CF-End frame with a non-matching BSSID, the AP may take further action to transmit a subsequent CF-End frame with its own BSSID based on a check that NAV was not set by a device in its own BSS.

In all of the above proposed embodiments, when a WTRU/AP receives a CF-End frame with a non-matching BSSID and with the individual/group bit of the TA field in the CF-End frame set to a value (0 or 1), the WTRU/AP may take further action to clear its NAV based on a check that its NAV was not set based on a transmission by a device in its own BSS. In all the above proposed embodiments, when an AP receives a CF-End frame with a non-matching BSSID and with the individual/group bit of the TA field in the CF-End frame set to a value (0 or 1), the AP may take further action by transmitting a subsequent CF-End frame with its own BSSID based on a check that its NAV was not set based on transmission by a device in its own BSS.

As an alternative in all the above proposed embodiments, a WTRU or AP may transmit a CF-End frame with the BSSID field that may include its own MAC address indicating the identity of the transmitter of the CF-End frame. In such an alternative, a device, may check to see if the MAC address of the transmitter of the CF-End frame matches the TXOP holder address stored in the device. If there is a match then the device receiving the CF-End frame may reset its NAV.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method for use in a station (STA), the method comprising:
    transmitting, to an access point (AP), a first CF-End frame that includes a duration field and a basic service set identifier (BSSID) field that includes an individual/group bit with a value of one (1), wherein a physical layer (PHY) scrambling sequence of the first CF-End frame indicates a wideband 160 MHz bandwidth associated with a transmit opportunity (TXOP) being truncated by the STA; and
    receiving, from the AP, in response to the first CF-End frame, a second CF-End frame occupying a wideband 160 MHz bandwidth indicated by the PHY scrambling sequence of the first CF-End frame.

2. The method of claim 1, wherein the wideband 160 MHz bandwidth is an 80 MHZ+80 MHZ bandwidth.

3. The method of claim 2, wherein the 80 MHZ+80 MHz bandwidth comprises two 80 MHz channels that are not contiguous.

4. The method of claim 1, wherein two bits of the scrambling sequence of the first CF-End frame are used to indicate the wideband 160 MHz bandwidth associated with the TXOP being truncated by the STA.

5. The method of claim 1, further comprising:
    receiving the second CF-End frame after a short inter-frame space (SIFS) duration.

6. The method of claim 1, wherein the STA is associated with a basic service set (BSS) that the AP is not associated with.

7. A station (STA) comprising:
    a transmitter configured to transmit, to an access point (AP), a first CF-End frame that includes a duration field and a basic service set identifier (BSSID) field that includes an individual/group bit with a value of one (1), wherein a physical layer (PHY) scrambling sequence of the first CF-End frame indicates a wideband 160 MHz bandwidth associated with a transmit opportunity (TXOP) being truncated by the STA; and
    a receiver configured to receive, from the AP, in response to the first CF-End frame, a second CF-End frame occupying a wideband 160 MHz bandwidth indicated by the PHY scrambling sequence of the first CF-End frame.

8. The STA of claim 7, wherein the wideband 160 MHz bandwidth is an 80 MHz+80 MHz bandwidth.

9. The STA of claim 8, wherein the 80 MHz+80 MHz bandwidth comprises two 80 MHz channels that are not contiguous.

10. The STA of claim 7, wherein two bits of the scrambling sequence of the first CF-End frame are used to indicate the wideband 160 MHz bandwidth associated with the TXOP being truncated by the STA.

11. The STA of claim 7, wherein the receiver is configured to receive the second CF-End frame after a short inter-frame space (SIFS) duration.

12. The STA of claim 7, wherein the STA is associated with a basic service set (BSS) that the AP is not associated with.

13. A method for use in an access point (AP), the method comprising:
    receiving, from a station (STA), a first CF-End frame that includes a duration field and a basic service set identifier (BSSID) field that includes an individual/group bit with a value of one (1), wherein a physical layer (PHY) scrambling sequence of the first CF-End frame indicates a wideband 160 MHz bandwidth associated with a transmit opportunity (TXOP) being truncated by the STA; and
    transmitting, in response to the first CF-End frame, a second CF-End frame occupying a wideband 160 MHZ bandwidth indicated by the PHY scrambling sequence of the first CF-End frame.

14. The method of claim 13, wherein the wideband 160 MHz bandwidth is an 80 MHz+80 MHZ bandwidth.

15. The method of claim 14, wherein the 80 MHz+80 MHz bandwidth comprises two 80 MHz channels that are not contiguous.

16. The method of claim 13, wherein two bits of the scrambling sequence of the first CF-End frame are used to indicate the wideband 160 MHz bandwidth associated with the TXOP being truncated by the STA.

17. The method of claim 13, further comprising:
    transmitting the second CF-End frame after a short inter-frame space (SIFS) duration.

18. The method of claim 13, wherein the STA is not associated with the AP.

19. An access point (AP) comprising:
    a receiver configured to receive, from a station (STA), a first CF-End frame that includes a duration field and a basic service set identifier (BSSID) field that includes an individual/group bit with a value of one (1), wherein a physical layer (PHY) scrambling sequence of the first CF-End frame indicates a wideband 160 MHz bandwidth associated with a transmit opportunity (TXOP) being truncated by the STA; and
    a transmitter configured to transmit, in response to the first CF-End frame, a second CF-End frame occupying a wideband 160 MHz bandwidth indicated by the PHY scrambling sequence of the first CF-End frame.

20. The AP of claim 19, wherein the wideband 160 MHz bandwidth is an 80 MHz+80 MHz bandwidth.

21. The AP of claim 20, wherein the 80 MHz+80 MHz bandwidth comprises two 80 MHz channels that are not contiguous.

22. The AP of claim 19, wherein two bits of the scrambling sequence of the first CF-End frame are used to indicate the wideband 160 MHz bandwidth associated with the TXOP being truncated by the STA.

23. The AP of claim 19, wherein the transmitter is configured to transmit the second CF-End frame after a short inter-frame space (SIFS) duration.

24. The AP of claim 19, wherein the STA is not associated with the AP.

* * * * *